(12) United States Patent
Valiulis

(10) Patent No.: US 6,317,028 B1
(45) Date of Patent: *Nov. 13, 2001

(54) ELECTRONIC IDENTIFICATION, CONTROL, AND SECURITY SYSTEM AND METHOD FOR CONSUMER ELECTRONICS AND THE LIKE

(75) Inventor: Carl Valiulis, Rockford, IL (US)

(73) Assignee: Electronic Security and Identification LLC, Rockford, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,726

(22) Filed: Feb. 3, 1999

Related U.S. Application Data

(63) Continuation-in-part of application No. 09/122,599, filed on Jul. 24, 1998, now Pat. No. 6,005,476.

(51) Int. Cl.$^7$ .................................................. G08B 13/14

(52) U.S. Cl. .................... 340/10.1; 340/10.5; 340/572.1; 340/572.3

(58) Field of Search ................................ 340/10.1, 10.31, 340/825.07, 10.42, 10.5, 825.34, 825.35, 825.31, 255.08, 572.1; 235/375, 380, 382, 382.5, 385

(56) References Cited

U.S. PATENT DOCUMENTS

| 4,567,557 | 1/1986 | Burns ................................... 364/145 |
| 5,021,779 | 6/1991 | Bisak ................................ 340/825.69 |
| 5,051,720 | 9/1991 | Kittirutsunetorn ................ 340/310 R |
| 5,334,975 | 8/1994 | Wachob et al. ................... 340/825.21 |

(List continued on next page.)

FOREIGN PATENT DOCUMENTS 0 369 382 A2   5/1990   (EP) .

OTHER PUBLICATIONS

Passive RFID Basics, by Pete Sorrells of Microchip Technology Inc., copyright 1998.

microID RFID Development Kit, by Kevin R. Sharp, Nov. 1998 (part one of two vol.), vol. 18–No. 11, pp. 48–49 of "ID Systems" magazine.

Scan–Tech 1998, by Kevin R. Sharp, Nov. 1998 (part one of two vol.), vol. 18–No. 11, pp. 50, 52–53 of "ID Systems" magazine.

(List continued on next page.)

Primary Examiner—Donnie L. Crosland
(74) Attorney, Agent, or Firm—Leydig, Voit & Mayer, Ltd.

(57) ABSTRACT

An electronic identification, control, and security system comprises a unique identification code associated with each manufactured article, a password code, communication circuitry capable of transmitting the password code to the manufactured articles, and appliance disabling circuitry. The appliance disabling circuitry may be integrated with the manufactured articles and precludes operation of the manufactured articles upon receipt of the password code. The communication circuitry preferably includes RFID technology to transmit the password code to the article and receive the unique identification code from the article. Such system deters theft of the articles. A method for deterring theft of manufactured articles includes the steps of providing a unique identification code for each manufactured article, transmitting a password via radio frequency to each manufactured article, and disabling operation of each manufactured article in response to receipt of the password. A manufactured appliance comprises security and control logic circuitry, data storage memory, a unique identification code stored in the memory, and communication circuitry for receiving a transmitted password. The security and control logic disables operation of the manufactured appliance in response to receipt of the password.

12 Claims, 14 Drawing Sheets

U.S. PATENT DOCUMENTS

| | | | | |
|---|---|---|---|---|
| 5,340,968 | * | 8/1994 | Wantabe et al. | 235/380 |
| 5,400,246 | | 3/1995 | Wilson et al. | 364/146 |
| 5,406,261 | * | 4/1995 | Glenn | 340/571 |
| 5,428,342 | | 6/1995 | Enoki et al. | 340/511 |
| 5,471,190 | | 11/1995 | Zimmerman | 340/310.01 |
| 5,479,157 | * | 12/1995 | Suman et al. | 340/825.31 |
| 5,491,463 | | 2/1996 | Sargeant et al. | 340/310.01 |
| 5,554,968 | | 9/1996 | Lee | 340/310.01 |
| 5,570,085 | | 10/1996 | Bertsch | 340/825.07 |
| 5,621,662 | | 4/1997 | Humphries et al. | 364/550 |
| 5,748,084 | * | 5/1998 | Isikoff | 340/568 |
| 5,764,892 | * | 6/1998 | Cain et al. | 340/825.34 |
| 5,936,526 | * | 8/1999 | Klein | 340/571 |
| 5,966,081 | * | 10/1999 | Chesnutt | 340/825.31 |
| 6,011,473 | * | 1/2000 | Klein | 340/571 |

OTHER PUBLICATIONS

What's New in RFID?, by Paul Quinn, ID Systems Feb. 1998 Technology Update located at http://www.idsystems.com/rfid0298.htm.

Disposable RF Labels, by Kevin R. Sharp, ID Systems Oct. 1998 Product Spotlight located at http://www.idsystems.com/pos1098.htm.

Tag–It Implementation, ID Systems Oct. 1998 Product Spotlight located at http://www.idsystems.com/ps1098_sb1.htm.

RFID Frequency Considerations, ID Systems Nov. 1998 Show Coverage located at http://www.idsystems.com/st1198_sb1.htm.

*Article entitled"ID Tags Can Foil Shoplifters", Popular Mechanics, Jan. 1999 edition, p. 23.

* cited by examiner

ELECTRONIC IDENTIFICATION, CONTROL, AND SECURITY SYSTEM AND METHOD FOR CONSUMER ELECTRONICS AND THE LIKE

RELATED APPLICATIONS

This application is a Continuation-in-Part of application Ser. No. 09/122,599, filed Jul. 24, 1998 now U.S. Pat. No. 6,005,476.

FIELD OF THE INVENTION

This invention relates to a system and method to remotely communicate with appliances and other consumer electronics, and more particularly to a system and a method which allows remote communication, control, and security for consumer electronics via radio frequency transmission and the electric power distribution network.

BACKGROUND OF THE INVENTION

Continued advances in the field of consumer electronics and appliances have added a significant number of features to these devices which make their operation simpler, while at the same time increasing their overall functionality. Most pieces of consumer electronics and appliances manufactured today include some sort of computer control within the unit itself. These computers control everything from automatically remembering leap year and adjusting the number of days in February, to the on-screen menu display, picture in picture control, cook cycle time control, to name just a few. While these microprocessors are controlling ever increasing functionality of the consumer electronic devices and appliances into which they are incorporated, their capacity for further increases remains vast. Even with these advanced features and computer control, modern manufacturing techniques have allowed the cost of these devices to decrease since their initial introduction onto the market. However, even with such decreases, the cost of these electronic devices and appliances still remains fairly expensive.

A persistent problem with electronic appliances exists mainly due to their expense and ease of portability. This problem is the ease with which electronic appliances are stolen from homes, warehouses, and during transit. Because these devices are so enjoyable to own, and yet are priced out of the reach of many citizens, a significant market for stolen electronic appliances exists. Their ease of portability and lack of security features and identification, as well as the relativity high probability that the recipient of the stolen merchandise will not be caught, or if so not prosecuted, only exacerbates this problem. Currently, most consumer electronics devices only carry a written serial number on the device to identify it in the event of a theft, however, since many individuals fail to record or register this serial number, attempts to recover merchandise once it has been stolen often prove futile.

At the manufacturing level, companies are continually looking for new methods to keep track of their inventory in an effort to better manage the business and prevent loss through theft. One relatively new technology which many companies are now beginning to utilize is a system of product identification and tracking known as RFID (radio frequency identification). This new technology is primarily used for inventory control and tracking within the factory area and warehouse, and is typically associated with the packaging of the product (a RFID label or tag on the box), and not with the product itself.

RFID systems use radio frequency to identify, locate, and track items through a system comprising primarily of three components. The system operates under control of a host computer which contains all of the inventory database information required for operation of this system. A passive RFID tag is the second component of the system and is typically applied via a disposable label to product packaging in similar fashion to a bar code tracking label. This disposable label contains an antenna coil and a silicon chip, and requires no separate power source. The silicon chip includes basic modulation circuitry and non-volatile memory to store product identification information. This disposable label is energized by the third component of the system, a RFID reader or interrogator, which transmits a RF signal to the disposable label. As the radio frequency signal passes through the antenna coil, an AC voltage is generated thereacross. This voltage is rectified to supply power to the silicon chip which then transmits the information stored therein back to the reader. This information transmission technique is commonly known as backscattering.

Current RFID labels work in one of three frequency ranges. Low frequency tags generally operate below 135 kHz and are commonly used for access control and industrial control. While energy at this frequency readily moves through people and other obstacles, data rates are relatively low compared to those of other technologies. Another frequency band used for RFID labels centers around 2.45 GHz, and operates under the same regulatory guidelines as local area networks OpenAir and 802.11. While data rates are greatly increased over the low frequency systems, the ability to transmit this energy through obstacles is somewhat reduced. A benefit of this higher frequency system is that the antennas may be much smaller, and can be etched or screen printed instead of wound from wire. The third frequency band commonly used for RFID labels is 13.56 MHz, a frequency that has been allocated in much of the industrialized world. While data rates are higher and antennas are smaller than with other frequencies, the read ranges are often shorter. A benefit of using this frequency exists due to the world wide allocation of this frequency which means that products may be deployed around the world with little or no modification to the RHD label.

The amount of information which is able to be carried by a RFID label is be quite large. One commercial implementation of a RFID label is marketed by Texas Instruments under the name Tag-It. These commercially available RFID labels provide 256 bytes of user programmable read/write memory partitioned into eight 32 byte blocks. A ninth block contains revision and manufacturing information, while a tenth block contains a unique 32 byte ID code sequentially assigned during manufacturing which is able to provide 4.3 billion unique label identities. Other designs including more or fewer programmable bytes are also available. The distance at which the readers may read the memory information from the RFID label depends on environmental conditions and obstructions, and for the TI Tag-It label is roughly equivalent to distances achievable by state of the art hand held CCD bar code scanners. However, whereas bar codes must be visible and relatively close to the reader in order to be read, the RFID label may be hidden from view, and depending on the design, may be read from several feet away, perhaps even 100 yards away without human intervention.

In addition to increasing the distances at which RFID labels may be utilized, the technology associated with RFID continues to increase the number of RFID labels which may be read simultaneously by a single reader. Various systems exist for simultaneous RFID tag communication. One such method marketed by Texas Instruments is known as SID (Simultaneous Identification) and is currently able to read thirty tags per second. The SID algorithm uses a binary tree search through the unique code stored in the RFID label, using commands that can silence tags momentarily to allow the read of information from other tags. Another system takes advantage of a pseudo random number generator within the RFID label to command the tags to stop transmitting until a generated pseudo random number counts down. In this way, the probability of two tags counting down to the same pseudo random number and beginning to retransmit simultaneously is sufficiently low to allow proper operation of the system.

While the RFID label system promises great advances in the field of product tracking and inventory control, its ability to prevent theft is somewhat limited. Specifically, since the RFID labels are placed on product packaging, a thief would merely need to remove this label from the packaging in order to defeat any further tracking of the product. Alternatively, a thief would simply need to remove the product from the packaging to also defeat further product tracking. A product so stolen remains fully operational, and therefore, has a high black market value.

While the removal of the RFID label from the product packaging could be overcome by installing this label within the product itself, limitations on the distance at which a product may be scanned, the time required to complete the scan, and the reduced ability to scan information through obstacles greatly reduces the ability of these RFID) labels to provide theft deterrence. Specifically, products could be removed from a warehouse by placing an appropriate shield between the product and the readers to prevent detection of the theft at the first instance. However, even if the readers were able to detect the actual theft of the products, since these products remain fully operational and since the ability to detect the RFID label over distance and through obstacles in very difficult at the power levels of conventional RFID labels, the probability of recovering the stolen merchandise is very small once sold on the black market. Theft during transit of these products is even less problematic for the thief since there are no readers to defeat which would provide initial detection of the theft. 1995 estimates of theft within the freight industry alone is $10 billion dollars. This equates to 2.5% of $400 billion dollar industry.

One of the reasons for such a high volume of theft, as mentioned briefly above, is because the electronic devices are so enjoyable to own. The continued advances with the consumer electronics have greatly simplified their use both in terms of programmability and user interaction. One user interaction feature with which most consumers have become quite accustomed is the ability to remotely control their TV, stereo, VCR, camcorder, etc. While several items of consumer electronics offer this remote control feature in a line-of-sight fashion with a hand held remote controller, the desire to electrically remotely control other appliances in a non-line-of-sight fashion also exists.

In order to fulfill this desire to allow remote control of home appliances, electronic equipment, lighting, etc. several systems have been developed which allow control communications over a home's, electrical wiring system. However, since most home appliances and electronic equipment do not include communications and control circuitry to allow reception of the electrical system communication control signals, many of the systems which have been developed utilize separate plug-in modules which interface between an appliance's electrical cord and the home electrical outlet.

While there is currently still no universally accepted standard for this communication over a home's electrical wiring system, two protocols have emerged as the forerunners, and serve as a basis for many of the systems currently designed. The first such protocol is commercially known and marketed as the X-10 communications protocol. The second communications protocol which appears to be in wide use at this time is known as the consumer electronics bus protocol (CEBus). However, as mentioned above, neither one of these two has gained universal acceptance in the design of remotely controllable systems for home consumer appliances, lighting, etc. Indeed, several systems which claim to allow remote control of home appliances, lighting, etc., utilize their own communications protocol which does not adhere to either one of the two aforementioned communication protocol forerunners.

Exemplary systems which claim to allow remote control of home appliances, lighting, etc., may be found with reference to the following documents: U.S. Pat. Nos. 4,567, 557; 5,051,720; 5,334,975; 5,400,246; 5,471,190; 5,491, 463; 5,554,968; 5,570,085; 5,621,662; and European Patent Application No. 89 121025.4 bearing Publication No. 0 369 382 A2. The disclosure of each of these documents, particularly as they relate to communications protocols allowing remote communications over an electrical distribution system, are hereby incorporated by reference.

While each of the above-identified systems claim certain benefits for a remotely controllable system, none of the systems are able to distinguish individual appliances within a household, other than by their physical or programmed location within the household. Specifically, many of the above systems utilize separate control modules which are plugged into the house's electrical outlets, and may be themselves remotely controlled via communication received over the electrical wiring system. However, if one were to unplug a particular appliance from one of these modules and move it to a different physical location within the house, the remote control system has no way of knowing that this has taken place without manual user interaction. While this reprogramming may seem to be a minor problem in view of the infrequency with which most consumer electronics and appliances are actually moved within a household, in view of the fact that many people have trouble reprogramming their VCR clock, it is a problem to be avoided nonetheless.

The unacceptability of this problem may be best highlighted through an example. Assuming without admitting, that a remotely controlled system were capable of disabling a device, such as a television, at a certain time, if a parent were to disable a television set located in a child's room after 8:00 PM, a child would only have to unplug the television set from the current electrical receptacle and replug the television set into a different electrical receptacle in order to defeat the system programming and allow continued television viewing after 8:00 PM. While the parent could conceivably disable all of the electrical outlets to the child's room, such is undesirable as this would prevent the child from using a night light, clock radio alarm, etc. in his room. While this may appear to be a simplistic example, parents with kids who own video games may well disagree.

Another problem which exists from the user stand point, as discussed above from the manufacturer and transportation stand point is the ease at which these electronic devices are stolen from the home. In addition to the significant financial loss which must be borne by the homeowner as a result of a theft of these electronic devices, a significant safety risk exists to the homeowner from the presence of the thief within the home. While the presence of electronic devices may not be sole cause for home break-ins and thefts, the ease with which these items may be transported and sold on the black market certainly provides an incentive for these thieves.

A device which attempts to overcome this problem is described in U.S. Pat. No. 5,021,779, issued to Bisak on Jun. 4, 1991 for a SECURITY DFVICE. The system contemplated by this patent utilizes a receiver-decoder which is adapted and arranged to allow the appliance to operate in its normal mode when the receiver-decoder receives a predetermined code carried via the electrical wiring system within the home. If this predetermined code is not received by the receiver-decoder, the appliance enters a security mode of operation. Various alternative security modes of operation are described in this patent including the use of an alarm within the device, to trigger a transmitter device to sound an external alarm, or to transmit a silent signal to the police department upon being plugged in to allow the apprehension of the thieves. The encoder-transmitter of this system is arranged to frequency or phase modulate a carrier signal with a binary digital code and transmit that signal over the electrical wiring system to the electronic appliance plugged into the wall socket of the household. Once a consumer has set a particular code and transmitted that code over the electrical system to the electronic appliance, that code is kept in memory and used to compare subsequent receptions to determine of the appliance is still connected within that consumer's household.

However, as with the above-described control systems, the system of the Bisak '779 patent does not allow for individual identification of electronic appliances coupled to the system. Nor does this system allow any type of control of the electronic devices coupled to the electrical system of house. Further, this security device operates on its own communications protocol operating at 260 kHz and transmitting a unique binary digital code which is suited only to the security feature. The system of Bisak '779 also does not address the problem of theft at the manufactory or transportation levels.

SUMMARY OF THE INVENTION

It is therefore an object of the instant invention to overcome many of these and other problems existing in the art. More particularly, it is an object of the instant invention to provide an electronic system of identification, control, and security for use with electronic and electrical appliances. Specifically, it is an object of the instant invention to provide an electronic system which may be utilized as part of the inventory tracking and control system at the manufacturing level, and which deters theft within the manufacturer's inventory control system. Further, it is an object of the instant invention to provide an electronic system which allows for inventory and product identification and control at the transportation level, and which also provides for theft deterrence while in transit. Furthermore, it is an object of the instant invention to provide an electronic system which allows for inventory control at the retail level and which provides theft deterrence there as well. Once purchased, it is an object of the instant invention to provide a system which is capable of individually identifying particular electronic components within a household regardless of the physical location of that device. It is a further object of the instant invention to provide a system which allows for individualized control of an uniquely identified electronic appliance within a household. Further, it is an object of the instant invention to provide a system which deters the theft of electronic devices from the household.

In view of these objects, it is therefore a feature of the instant invention to provide a system which electronically uniquely identifies each electronic appliance manufactured and sold throughout the world. It is a further feature of the instant invention to utilize this unique electronic identification system in the control and security of these electronic appliances. At least the manufacturing, distribution, transportation, and retail levels it is a feature of the instant invention to utilize RFID technology to identify, track, and secure individual products. It is a further feature of the instant invention that the RFID technology is integrated into the electronic appliances' control structure. It is also a feature of the instant invention to utilize a factory preset security code via the RFID interface which disables the electronic appliance during transit and storage until the electronic appliance is sold to a consumer. Further it is a feature of the invention to include the RFID within the appliance. It is also a feature of the invention to provide the RFID portion externally to the appliance to allow replaceability thereof with other technology communication modules, including other RFID frequency systems, power line communications, and direct modem communications modules. Additionally, it is a feature of the instant invention to utilize electronic communication over the electrical wiring system of a residence to communicate the individual identities, control, and security codes generated by the system.

As may be apparent to one skilled in the art from the foregoing, the system of the instant invention provides a method for deterring theft of manufactured articles. In a preferred embodiment the method comprises the steps of providing a unique universal product protection code (UPPC) for each manufactured article, transmitting a password via radio frequency to each manufactured article, and disabling operation of each manufactured article in response to receipt of the password. The method further comprises the steps of associating the UPPC with the password in a computer system, receiving UPPC information from a user for a particular manufactured article, recalling the password associated with the UPPC information for the particular manufactured article, and transmitting the password to the user to enable operation of the particular manufactured article. Preferably, the method further comprises the steps of interrogating at least one manufactured article for the UPPC information prior to transport, storing the UPPC information in a computerized shipping system, interrogating the manufactured article for the UPPC information upon receipt of the manufactured article, and comparing the UPPC information stored in the computerized shipping system with the UPPC information interrogated upon receipt to confirm receipt of the manufactured article transported.

The method preferably further comprises, before the step of transmitting a password via radio frequency to each manufactured article, the steps of interrogating at least one manufactured article for the UPPC information prior to transport, storing the UPPC information in a computerized shipping system, and generating the password in the computerized shipping system. A preferred method further comprises the steps of interrogating the manufactured article for the UPPC information upon receipt, comparing the UPPC information stored in the computerized shipping system with the UPPC information interrogated upon receipt to confirm receipt of the article transported, and transmitting the password from the computerized shipping system to the manufactured article to enable its operation.

A preferred method of the instant invention further comprises the steps of transmitting the associated UPPC and password information to a central computerized system, interrogating the manufactured article at a point of purchase to retrieve the UPPC information, retrieving the password associated with the UPPC for the manufactured article, and transmitting the password to the manufactured article at the point of purchase to enable its operation. Further, a preferred method comprises the steps of energizing the manufactured article, setting a user defined password for the manufactured article, and disabling operation of the manufactured article upon loss of energization. Additionally, a preferred method further comprises the steps of energizing the manufactured article, entering the user defined password for the manufactured article to re-enable its operation. Preferably, the method further comprises the steps of storing the user defined password and the UPPC in a computer system, transmitting the UPPC to the computer system upon energization of the manufactured article, and transmitting the user defined password to the manufactured article to enable its operation. Additionally, a preferred method further comprises the steps of periodically interrogating the manufactured article to determine its presence and enunciating the absence of the manufactured article in response to a lack of response to the step of periodically interrogating.

A preferred system of the instant invention for deterring theft of manufactured articles comprises a unique identification code associated with each manufactured article, a password code, communication circuitry capable of transmitting the password code to the manufactured articles, and appliance disabling circuitry suitable for integration with the manufactured articles. This appliance disabling circuitry precludes operation of the manufactured articles upon receipt of the password code. Preferably, the system further comprises a computerized database. This said computerized database stores the unique identification code in association with the password. In a preferred system, the communication circuitry comprises an RFID interrogator and an RFID device. Preferably, the RFID device is suitable for integration within the manufactured articles. The system also preferably comprises communication interface circuitry interposed between the communication circuitry and the appliance disabling circuitry. In this embodiment, the RFID device removably interfaces with the communication interface circuitry. The system may also preferably comprise secondary communications circuitry capable of transmitting the password code to the manufactured articles.

A manufactured appliance in accordance with a preferred embodiment of the instant invention comprises security and control logic circuitry, data storage memory, a unique identification code stored in the memory, and communication circuitry capable of receiving a transmitted password. Preferably, the security and control logic disables operation of the manufactured appliance in response to receipt of the password. In a preferred embodiment the communication circuitry is an RFID device. Further, a preferred appliance comprises secondary communication interface circuitry capable of receiving the password from an external communication system.

In a preferred embodiment of the instant invention, an electronic identification, control, and security system comprises an electric power distribution network having a plurality of electric conductors and a plurality of electrical outlets providing electrical coupling thereto, a controller electrically coupled to the electric power distribution network through one of the electrical outlets, and an appliance electrically coupled to the electric power distribution network through one of the electrical outlets. Preferably, the appliance includes security and control logic, a communication interface interposed between the logic and the electric power distribution network, and circuitry or software for disabling operation of the appliance which is controlled by the logic. Tile controller transmits individualized information to the appliance via the electric power distribution network. This individualized information is independent of a physical location of the appliance.

In a preferred embodiment, the controller is a personal computer having a controller, a display, a user interface, and a communication module interposed between the controller and the electric power distribution network. Alternatively, the controller may be a portable unit having, a microcontroller, a display, a user interface, and a communication interface interposed between the microcontroller and the electric power distribution network. Preferably, this portable unit further includes a personal computer interface port.

In such a system in accordance with the teachings of the instant invention, the appliance includes a unique identification code stored therein. The individualized information transmitted by the controller contains an address portion containing the unique identification code. This unique identification code may be set by a manufacturer of the appliance, and may be reset by the consumer.

Preferably, the appliance also includes a security code stored therein. In this case, the individualized information contains the security code to allow operation of the appliance. The controller may periodically transmit the individualized information containing the security code, in which case the security and control logic commands the circuitry or software of the appliance to disable its operation in the absence of receipt of the this individualized information after a predetermined time. Alternatively, the security and control logic commands the circuitry or software of the appliance to disable its operation in the absence of receipt of the individualized information containing the security code after a predetermined time from electric coupling to the electric power distribution network. As an alternative embodiment, the security and control logic commands the circuitry or software to enable operation of the appliance upon receipt of the individualized information containing the security code.

In a preferred embodiment of the instant invention, the individualized information contains a control portion, and the logic is responsive to this control portion to control operation of the appliance. The controller generates this control portion in response to user commands, or alternatively in response to a user defined operational program.

In accordance with the teachings of the instant invention, an appliance for use in an electronic identification, control, and security system comprises an electric power connector adapted to couple the appliance to the electric power distribution network via an electrical outlet, security and control logic, a communication interface interposed between the logic and the electric power connector, and circuitry or software for enabling and disabling operation of the appliance. Preferably, the circuitry or software is controlled by the logic. This appliance preferably further comprises a unique identification code stored therein. Using this, the logic responds only to messages containing the unique identification code. Additionally or alternatively, the appliance further comprises a security code stored therein. The logic then may command the circuitry or software to enable operation of the appliance upon receipt of the security code. The logic also commands the circuitry or software to disable operation of the appliance after a predetermined time from last receipt of the security code.

A portable controller for use in this electronic identification, control, and security system preferably comprises an electric power connector adapted to couple the controller to the electric power distribution network via an electrical outlet, a microcontroller, a memory storage device, a display, a user interface, and a communication interface interposed between the microcontroller and the electric power connector. The microcontroller generates individualized information for transmission by the communication interface to the appliance via the electric power distribution network. Additionally, this portable controller may further comprise a computer interface port.

In accordance with an embodiment of the instant invention, the microcontroller generates security code information for transmission by the communication interface to the appliance via the electric power distribution network in response to user input from the user interface. The microcontroller periodically generates this security code information for transmission by the communication interface to the appliance via the electric power distribution network. Preferably, the appliance includes an unique identification code. The portable controller stores this unique identification code in the memory storage device and includes it in the individualized information.

Further in accordance with the teachings of the instant invention and for use in association with an appliance in an electronic identification, control, and security system, an adapter comprises security and control logic, a communication interface electrically coupled to the logic and the electric power distribution network, and circuitry or software for enabling and disabling operation of the appliance. This circuitry or software is controlled by the logic and electrically interposed between the outlet and the electric power connector of the appliance.

These and other aims, objectives, and advantages of the invention, will become more apparent from the following detailed description while taken into conjunction with the accompanying drawings.

Figure 1:
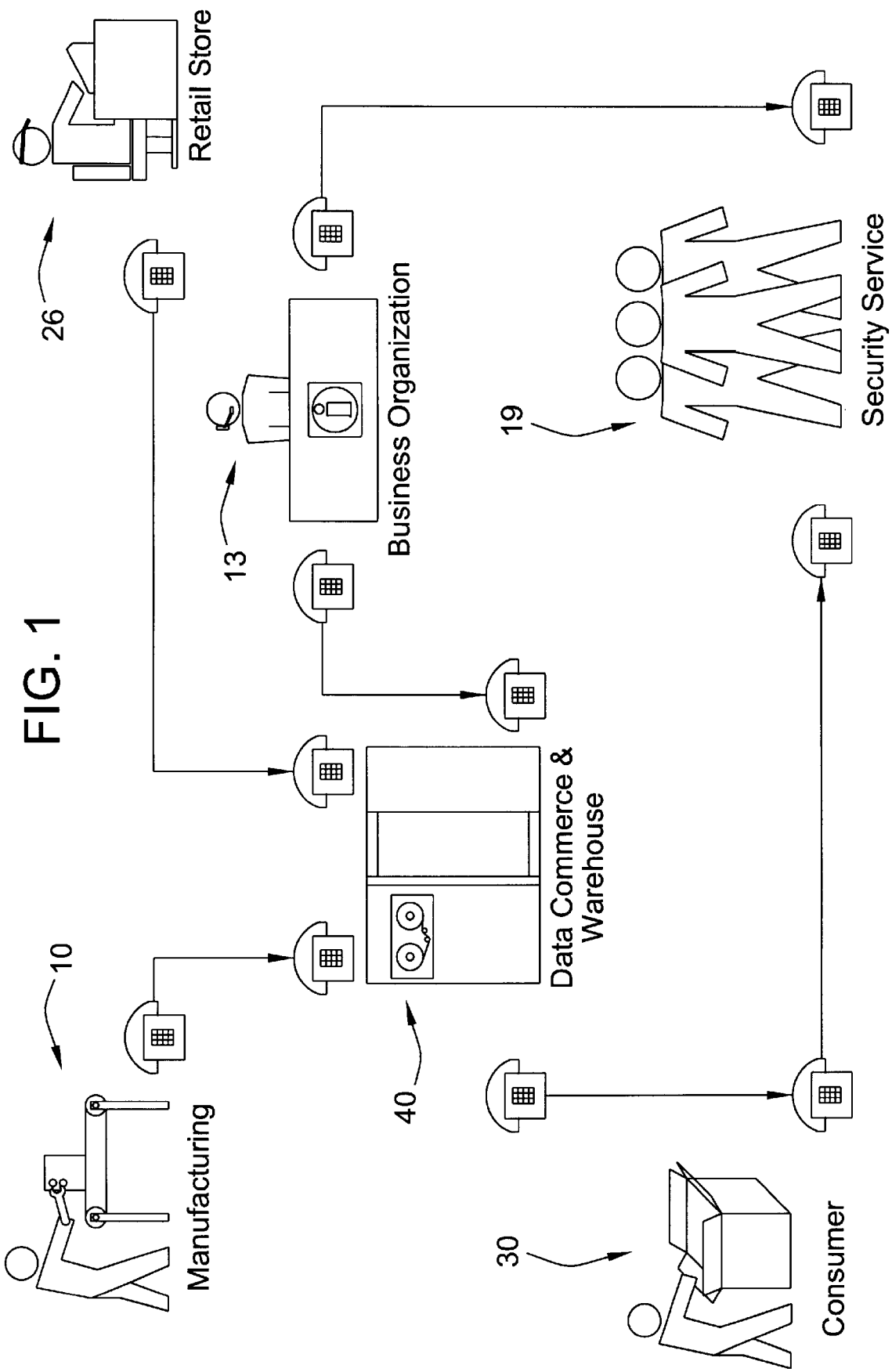
FIG. 1 is a system overview communications diagram of a system constructed in accordance with the instant invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENTS

To gain an understanding of the value and benefits of the system of the instant invention, an overall system level understanding is provided with reference to FIG. 1 before the design details of any aspect of a particular embodiment of the invention is discussed. With the system of the instant invention, both inventory tracking and theft prevention may be accomplished. At the manufacturing level 10 individual appliances are constructed with security circuitry which allows the device to be disable and prevented from operating until such time as the appliance is re-enabled. In an embodiment of the instant invention the security circuitry includes an RFID interface to allow RF transmission and tracking of the individual appliances through the manufacturing and inventory process. From the security aspect of the invention a manufacturer sets a password through the RFID interface to disable the appliance from further operation. The RFID information also includes an unique appliance identification number known as a Universal Product Protection Code which may then be utilized for tracking of the product through the manufacturing and inventory process. Once the manufacturing process is complete and the appliance is ready to be shipped, the manufacturer may then send the Universal Product Protection Code (UPPC) information and the associated password to a data commerce and warehouse system. Since the appliance will remain in the disabled state until the password is transmitted to the appliance to enable operation thereof, theft of the appliance is deterred.

Once the transportation phase of the appliance life cycle is complete, the retail store 26 may then reenable the product for sale. To reenable operation of the product, the retail store 26 reads the serial number and requests transmission of the password from the data commerce and warehouse 40. Once the retail store has transmitted the password to the appliance, the appliance will operate in a normal fashion. As will be discussed more fully hereinbelow, the request for the password and reenabling of the appliance may take place as part of the point of sale through an automated credit card system. In this way the retail store will be assured that theft of the appliances while in the stores own inventory will be deterred. If the particular appliance is acquired by a business organization 17, that business organization can set a unique or corporate password to allow operation of the device while plugged in within the business organization. Once the password is transmitted to the appliance, it will continue to operate in a normal fashion until it is de-energized, typically by being unplugged. Once power is restored to the appliance, the appliance will enter a security mode of operation whereby normal operation will be precluded until transmission of the previously set password is transmitted to the appliance. Once again, theft of the appliance while at the business organization 17 is deterred. This password may be transmitted to the data commerce and warehouse 40 to provide a central electronic warehouse of the required enabling passwords in so desired. Additionally, because the system includes the TPPC which is unique for each appliance, a security service 19 may be notified upon detection of the unplugging of a device (the details of which will be provided more fully below).

If, on the other hand, the appliance is purchased from the retail store 26 by a consumer 30, it is the consumer who then may set a personal password for the appliance to allow its operation while plugged in to the consumer's dwelling. As with the business organization 17, the setting of the password by the consumer 30 will allow normal operation of the appliance until the appliance is de-energized, typically by unplugging the unit. Once the electronic appliance is plugged in or otherwise energized, it will enter the secure mode of operation precluding further operation until transmission of the personal password is complete. As discussed above, the theft of this appliance is therefore deterred. Also analogous to the business organization 17, the consumer 30 may transmit the UPPC and password information to the data commerce and warehouse 40 to provide a central registry of this information for disaster recovery and product retrieval in the event of actual theft. Likewise, the system of the instant invention at the consumer's dwelling may be programmed to contact a security service 19 for various theft related conditions such as the detection of more than one appliance being unplugged in a short period of time. The preferred mechanism for setting such a password in the consumer environment 30 is a personal computer or a hand held encoder/decoder as will be discussed more fully below.

While the system of FIG. 1 illustrates the use of a central data commerce and warehouse 40, one skilled in the art will recognize that such a centralized electronic data commerce and warehouse may not be desired. Such a system is illustrated in state diagrammatic form in FIG. 2 to which specific reference is now made. The discussion of this alternative embodiment of the system of the instant invention will focus on the functional operation of the system, highlighting each step of the manufacturing, transportation, distribution, and retail stage. In accordance with the teachings of the instant invention, therefore, an appliance manufacturer 10 manufactures an appliance having some form of functional electronics incorporated therein. During the manufacturing process, the appliance manufacturer 10 individually secures the appliance, as will be described more fully hereinbelow, to preclude any internal theft 12 of the appliance. Once the manufacturing process is complete, the appliance is transported 14 through the mails, via a common carrier such as a trucking company, a shipping company, or a train. Since the appliance is shipped from the appliance manufacturer 10 in a secured state, hijacking 16 of the appliance during transportation is no longer viable since a highjacked appliance cannot be operated, and therefore has an extremely low black market fence value. The secured appliance, therefore, will arrive at a distribution center 18 still in a secured state. From the distribution center 18, the appliance is then transported 20 to the various retail stores 26. Also during this phase of transportation 20, the highjacking, 22 of the appliance is equally disadvantageous due to the secured state of the appliance. Having arrived safely, the appliance may be stored in a stock room 24 until it is sold at the retail store 26.

In one embodiment of the instant invention, the retail store 26, upon successfully negotiating a purchase 28 with a consumer 30, requests security information 32 from the appliance manufacturer 10. In response, the appliance manufacturer 10 sends security information 34 to the retail store 26 to allow the appliance to be placed in an unsecured state at the time of purchase 28. Alternatively, the security information may be provided to the consumer either directly from the manufacturer 10 or through the retail store 26. In one embodiment, the appliance is provided with a fixed password which is provided to the consumer 30 to allow operation of the appliance.

Figure 2:
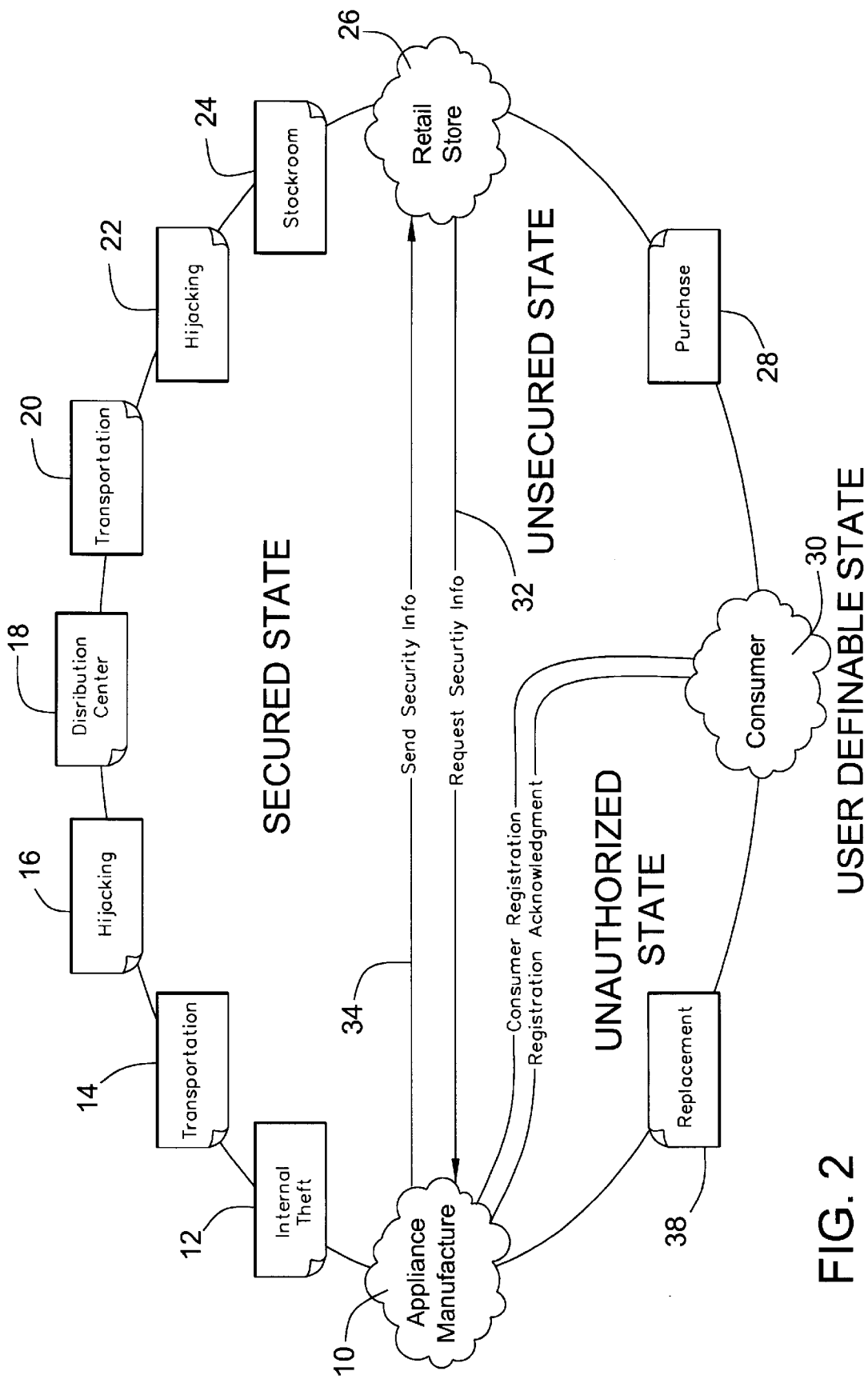
FIG. 2 is a system level state diagram functionally illustrating aspects of the instant invention.

Upon returning home with the purchased appliance, the consumer 30 may then secure the appliance as will be described more fully hereinbelow. Additionally, the consumer 30 may also register 36 the appliance with the appliance manufacturer, receiving a registration acknowledgment in response, to allow warranty claims and replacement 38 of appliance components in the future. These warranty claims and replacements 38 are indicated in FIG. 2 as being an unauthorized state which may actually be either (1) unsecured, or (2) set with a manufacturer password or a password which is communicated to the manufacturer to allow operational testing and repair of the appliance.

In the hands of the consumer 30, the appliance is in a user definable state. The user, in accordance with the teachings of the instant invention, may choose to secure the appliance from future theft, or may choose to leave the appliance in an unsecured state by simply failing to set the security feature within the unsecured appliance. The method for setting the security feature within the appliance, as well as the system used to provide this security, will be described more fully hereinbelow.

Figure 3:
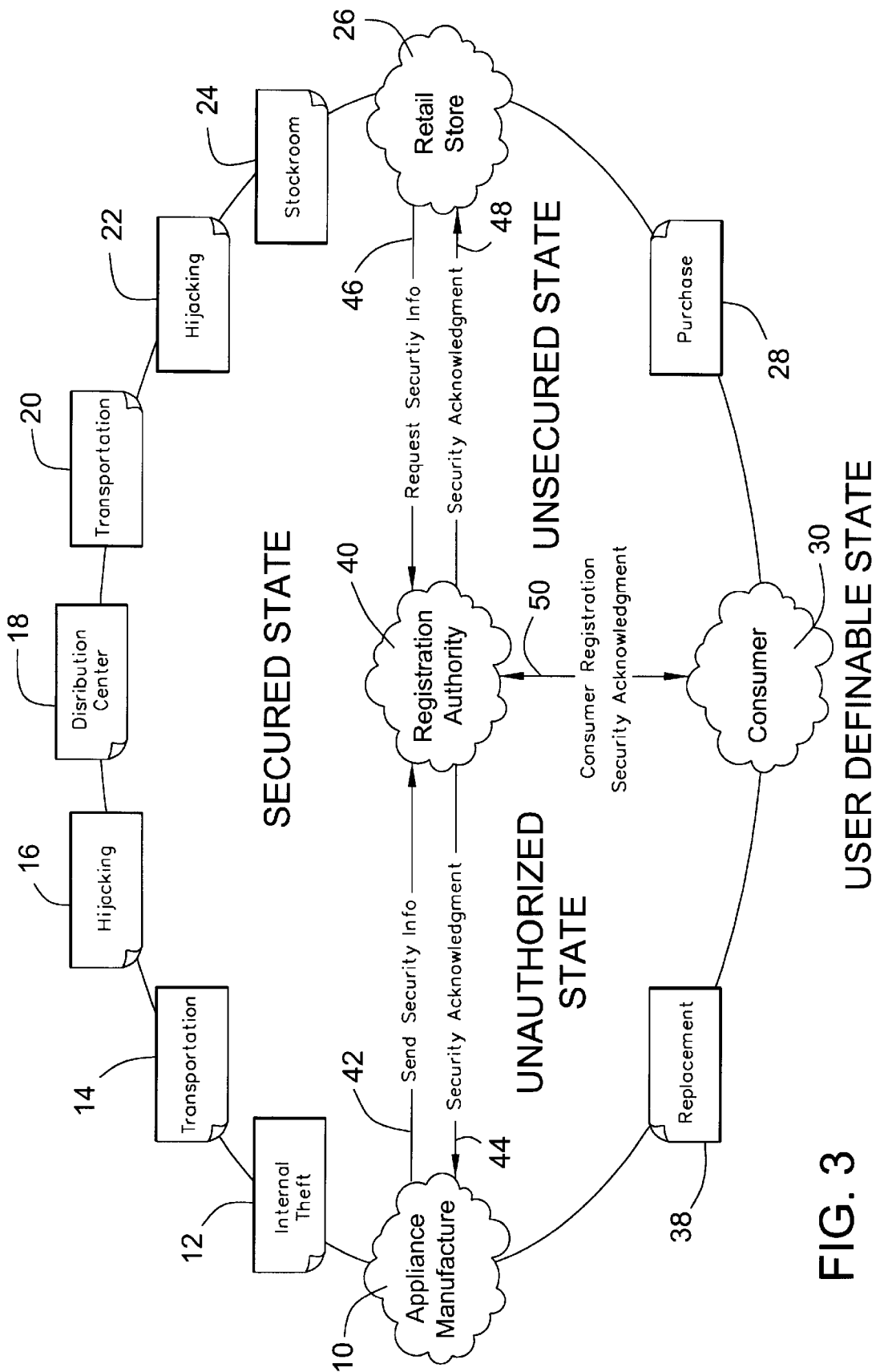
FIG. 3 is a system level state diagram illustrating system level states in an alternate embodiment of the instant invention.

In an alternate embodiment of the instant invention which is more closely linked to that of FIG. 1, as illustrated in FIG. 3, a central or distributed registration authority 40 is included within the system to provide central security and database tracking of security information for manufactured appliances to aid in the security, authentication, and theft recovery of consumer appliances. In this embodiment of the instant invention, the appliance manufacturer first sends security information for each of the appliances manufactured and secured therein to the registration authority. The registration authority 40 stores this security information for each manufactured appliance for later coordination and retrieval, and sends a security acknowledgment 44 to the appliance manufacturer 10. This indicates that the registration authority has successfully registered the secured appliance.

With this central authority 40, the retail store 26 no longer needs to communicate directly with the appliance manufacturer 10, but instead may request security information 46 directly from the registration authority 40 upon the negotiation of a purchase 28 with a consumer 30 of the secured appliance. In response, the registration authority 40 transmits 48 the security acknowledgment to the retail store 26 so that the appliance may be placed in the unsecured state, allowing the consumer 30 to later operate the appliance. Once in the hands of the consumer 30 the appliance is now in a user definable state wherein the user may, as described above, either choose to secure the appliance, or leave it in an unsecured state. Should the consumer decide to place the appliance in a secured state, he may do so without further required interaction with any other party. Alternatively, he may secure the device through a consumer registration communication 50 with the registration authority similarly as described above. Once the consumer registration information has been stored by the registration authority 40, a security acknowledgment 50, which may be a password, is transmitted to the consumer 30 via voice or modem communication. This password may then be utilized in one embodiment of the instant invention to unlock the consumer's ability to set his or her own password via the voice or modem communication. Security for this information transfer may be provided through any available means of encryption as appropriate.

In addition to the security and UPPC information which may be transmitted to and from the registration authority 40, once the appliance has been purchased from the retail store 26 consumer registration and warranty information received from the consumer 30 may be transmitted via the registration authority 40 to the appliance manufacturer 10. The registration authority 40 may also transmit manufacturing specifications, diagnostics, help, and other user manuals directly to the consumer 30 if so desired. The registration authority 40 also provides a mechanism for automatic notification of recall information or other safety issues which must be transmitted to the consumers 30 who have purchased the particular products for which this information is needed.

With this overall system level understanding of the invention in hand, a more detailed locus at each phase of the manufacturing, distribution, and retail sale of the appliance is now appropriate. Beginning with the manufacturing phase, and with reference now to FIG. 4, a manufacturer 10 encodes each individual appliance with a unique Universal Product Protection Code (UPPC) and a security password via a radio frequency transmission of this information. Preferably, an RFID reader or interrogator 21 is utilized in the manufacturing process to transmit this information directly to the individual appliances. This information is generated and stored by the manufacturer's business system 23 which typically has been used to track inventory and other information relating to the manufacturing process. In a preferred embodiment, each individual appliance is manufactured with a unique UPPC which is first read by the RFID interrogator 21 and transmitted to the business system 23. The business system 23 then preferable transmits to the interrogator 21 the security password information to be encoded into the individual appliance. The UPPC/password information is correlated and stored within the business system. This information may be transmitted from business system 23 to the registration authority 40 at any point during the manufacturing process, and is preferably transmitted as part of an online shipping system 25 used in association with the transportation provider.

When the system of the instant invention is utilized with an online shippingsystem 25, the shipping carrier 27 may verify the contents of the cargo through the use of an RFID interrogator 31. This interrogator 31 may utilize simultaneous communication techniques with the RFID system to allow verification of cargo contents without requiring individual scanning of the individual products on a shipping pallet. The information received through the RFID interface may be entered into the online system 25 via an encoder interface 33 which utilizes either an RF or docking station type interface with the interrogator 31. Once the information concerning the specific identity of each of the appliances being shipped is entered into the online shipping system 25 this information may be transmitted to the registration authority 40. Because the appliances have all been disabled at the manufacturing level 10 via the transmission of the password, theft in transit due to hijacking is greatly deterred. Alternatively, the shipping carrier may set its own password to maintain control over the shipment.

Figure 4:
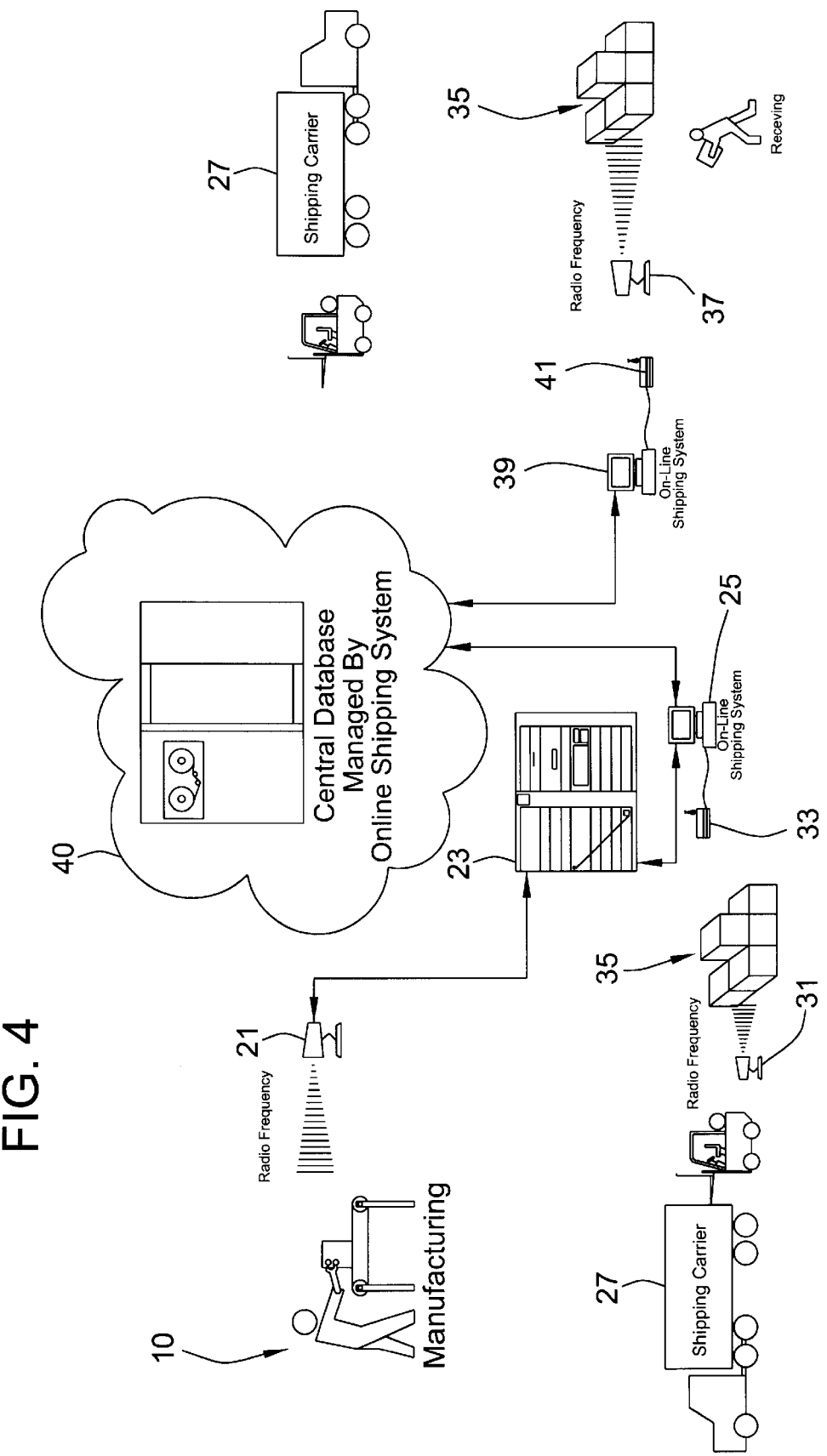
FIG. 4 is a system level diagram illustrating an implementation of the teachings of the instant invention at the manufacturing, transporting, and warehousing stages.

Once the cargo 35 arrives from the shipping carrier 27 at the warehouse, verification of the specific contents of the cargo 35 may be verified by interrogating this cargo 35 via an RFID interrogator 37. Once the interrogator 37 has retrieved all of the UPPC information, it may then verify receipt of all shipped goods via its own online shipping system 39 once the information has been transmitted thereto via the encoder interface 41. The verification may be made via communication with the registration authority 40 as illustrated in FIG. 4, or through communication with its own internal online shipping system as desired.

Figure 5:
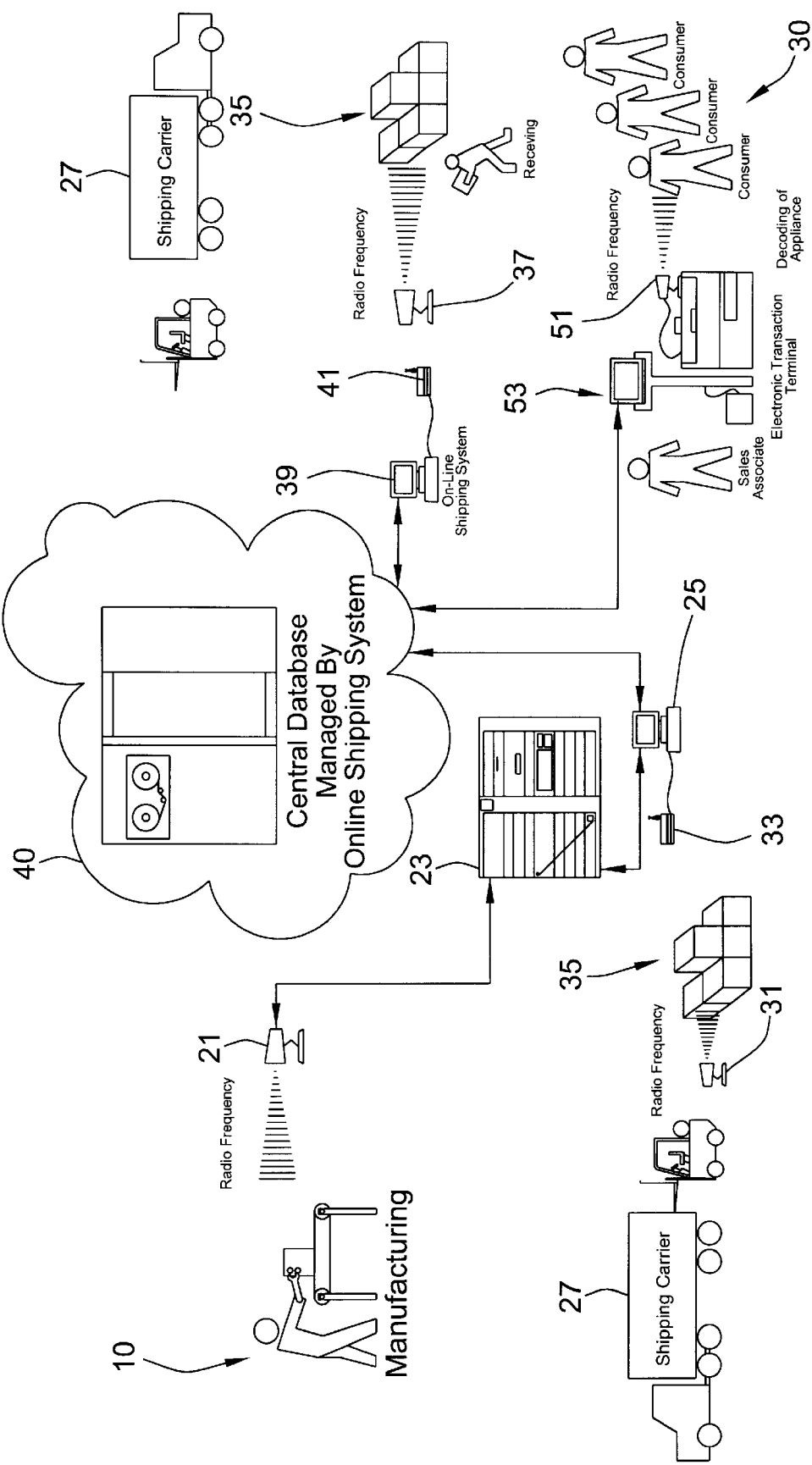
FIG. 5 is a system level diagram illustrating an implementation of the teachings of the instant invention at the retail sale phase.
Figure 6:
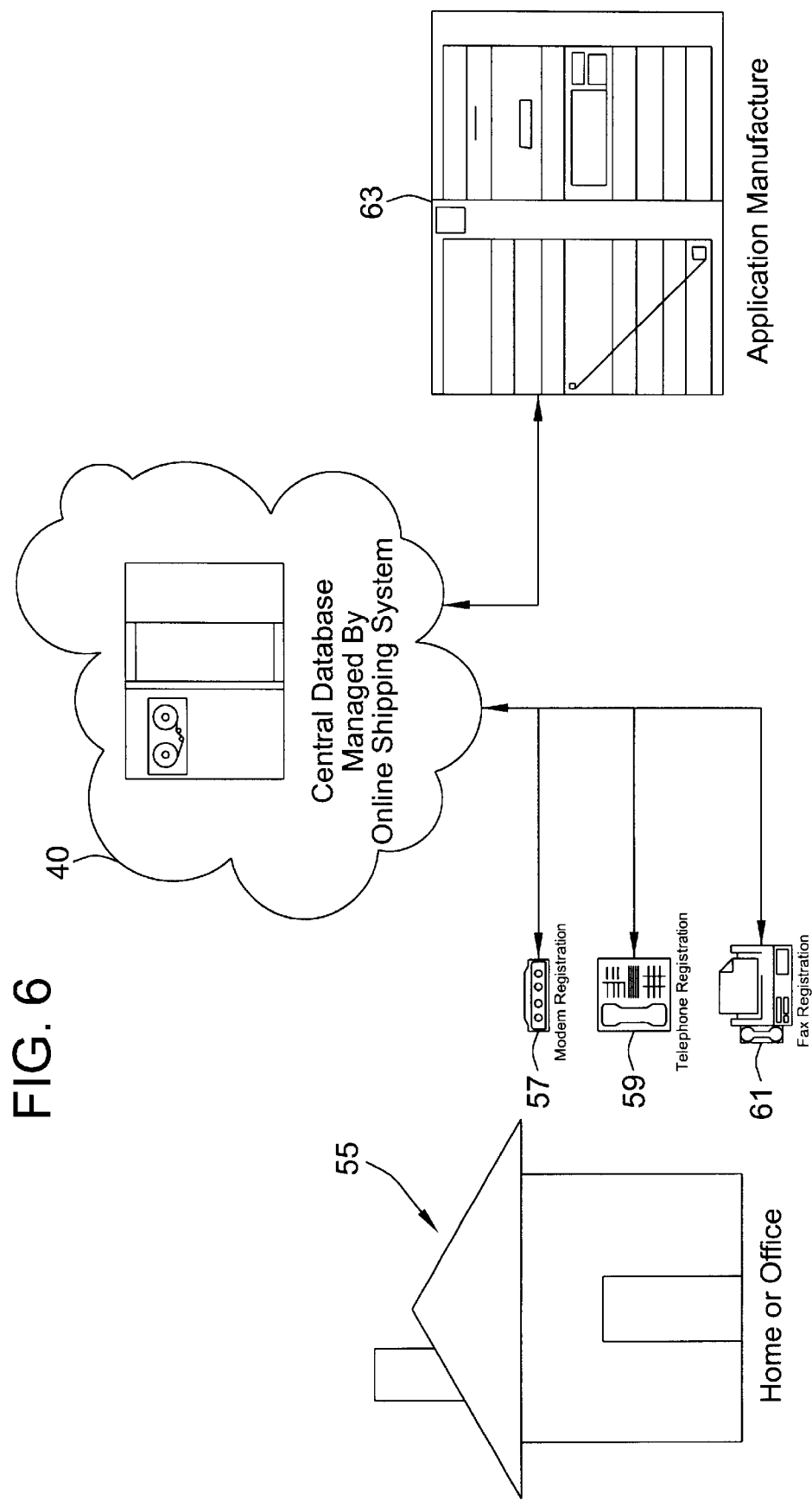
FIG. 6, is a system level diagram illustrating an implementation of the teachings of the instant invention in the consumer home and office phase.

The next phase of the product life cycle is the retail market which also integrates into the system of the instant invention as illustrated in FIG. 5. A preferred retail system will utilize an RFID interrogator 51 which is linked to an electronic transaction terminal point of sale system 53. This point of sale system 53 is preferably tied to the retail store's inventory control system which utilizes the product's UPPC. The point of sale system 53 may preferably communicate automatically to the central data base or registration authority 40 to retrieve the product's password to enable operation thereof. Once retrieved, the interrogator 51 transmits this password information to the electronic appliance, thereby enabling its operation for the consumer 30. Alternatively, the store may well decide to utilize its own internal password to enable and disable the operation of the appliances. In such an event, the communication link to the registration authority 40 would not necessarily be required, and could be replaced by a communication link to the store's own computerized data base which stores this information.

Once purchased, the consumers will typically install the electronic appliance in their home or office environment 55 as desired. Once in this environment, the consumer may register his purchase with the registration authority 40 by transmitting the UPPC and other information via a modem 57, via voice communication over the telephone 59, or even via facsimile 61. Once this information identifying the electronic appliance and the particular consumer is received by the central registration authority 40, appropriate portions of this information is then communicated to the consumer warranty registration system 63 of the appropriate appliance manufacturer.

Figure 7:
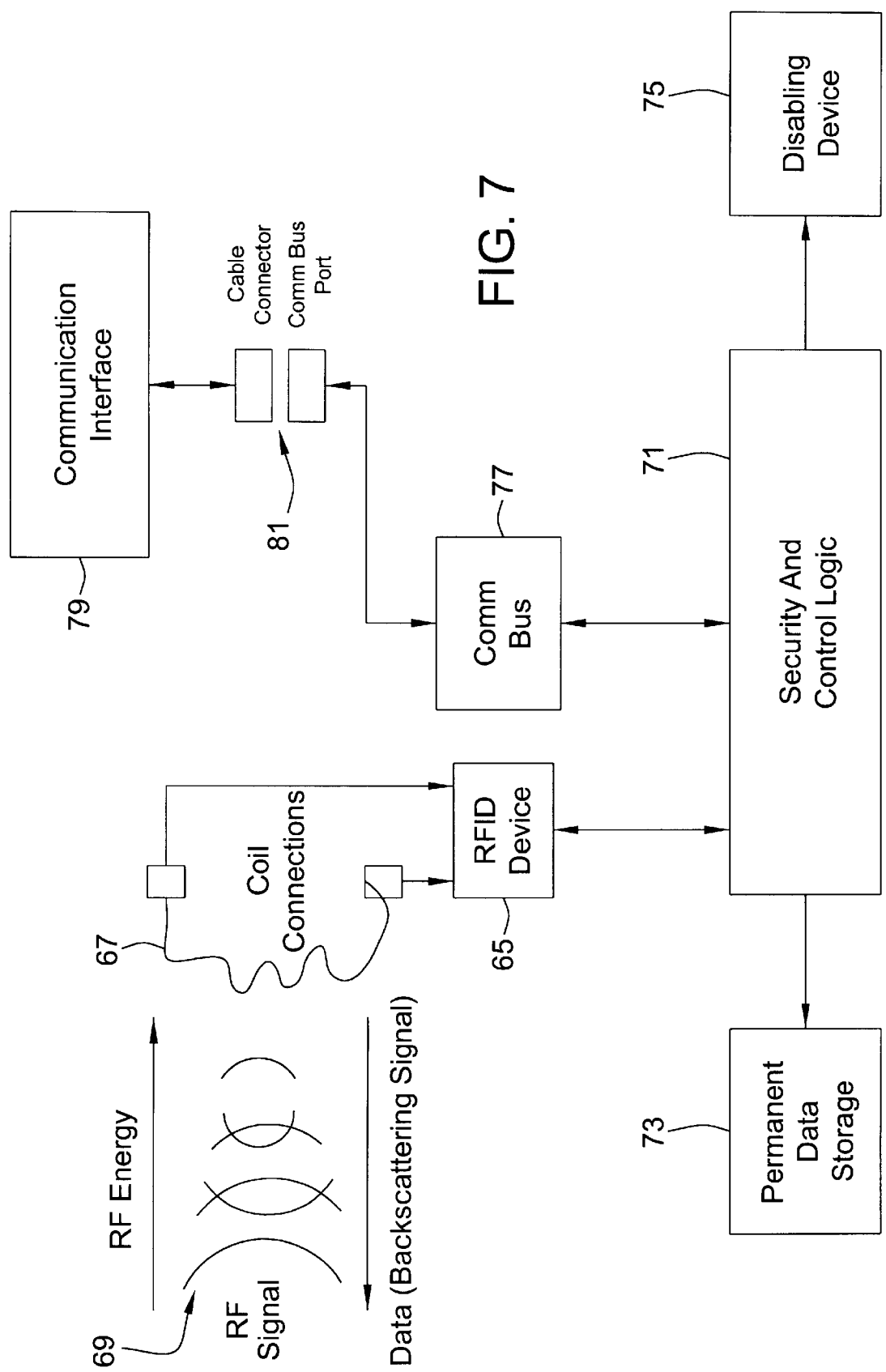
FIG. 7 is a single line block diagram illustrating an embodiment of the instant invention.

To allow for the above described system operation, a preferred embodiment of the instant invention incorporates within an electronic appliance a RFID device 65 as illustrated in single line block diagrammatic form in FIG. 7. As may be seen, the RFID device 65 includes a coil type antenna 67 which receives the transmitted RF signal 69. This transmitted RF signal includes both information and power, and serves both to energize the RFID device 65 as well as transmit information thereto. As discussed above, the RUID device 65 communicates with the interrogator (not shown) via a technique known as backscattering. Preferably, this RFID device 65 is integrated into the electronic appliance and communicates directly with the security and control logic 71 thereof. This security and control logic 71 includes permanent data storage 73 as is conventional. This permanent data storage 73 may maintain the UPPC and password information required by the system of the instant invention, or this information may be stored in the RFID device 65 itself as is common with conventional RFID devices. In any event, this information is coordinated through the security and control logic 71 of the appliance to disable operation of the appliance via a disabling device 75. This disabling device may take the form of control logic which prohibits operation of the appliance, hardware circuitry to prevent operation of the appliance, or a combination of both as appropriate for the particular appliance into which the system is incorporated.

A preferred embodiment of the instant invention also includes a communication bus 77 which interfaces with a communication interface 79 to allow hardware communication from the appliance to external devices. This communication interface 79 may be an external module which couples to the appliance through a communication bus port and cable connector 81. Use of an external module allows for wide adaptability of the system to multiple communication platforms within the home or office. Alternatively, the communication interface may be integrated within the appliance as desired.

Figure 8:
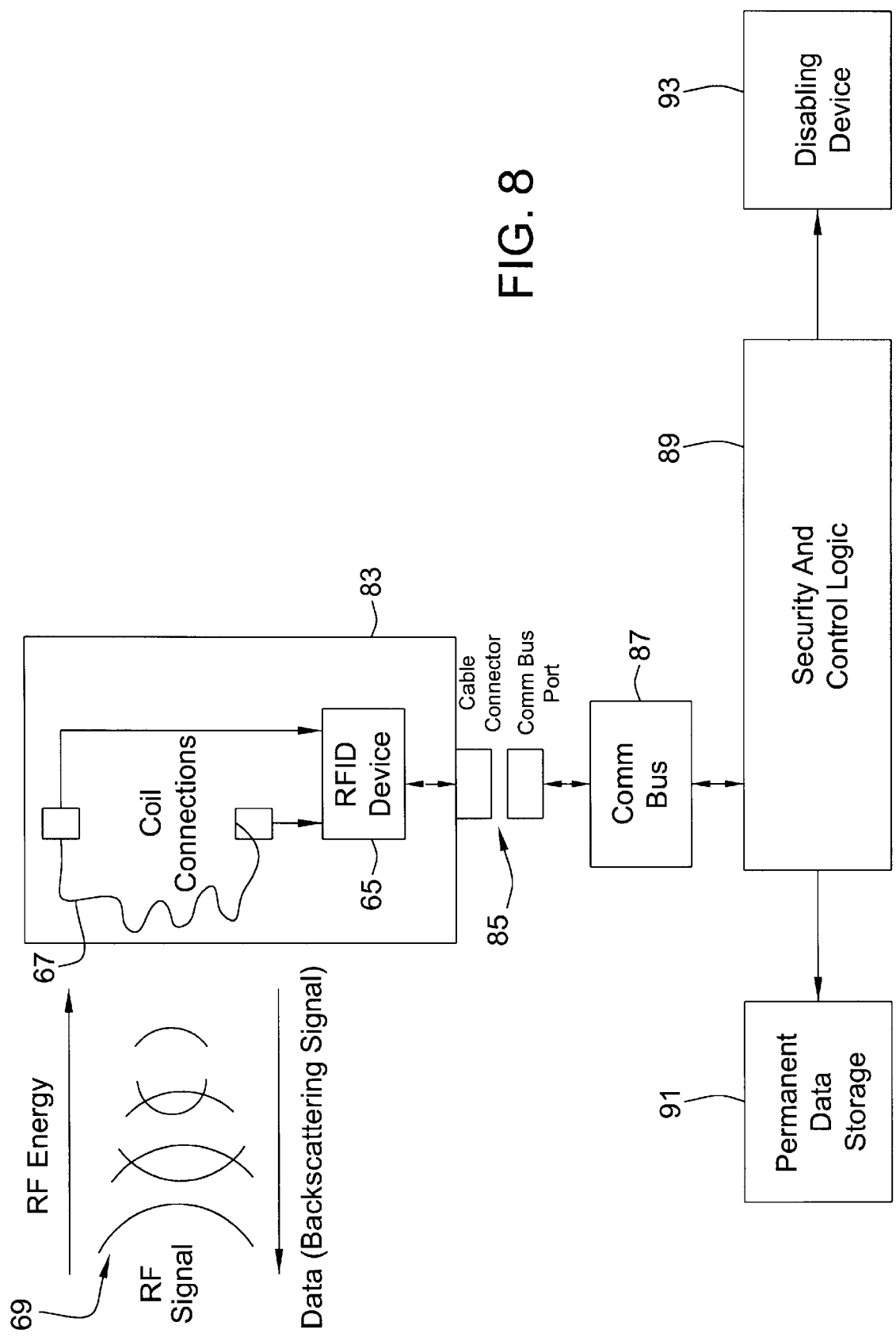
FIG. 8 is a single line block illustrating an alternative embodiment of the instant invention.

An alternative embodiment of the instant invention utilizing an external RFID interface is illustrated in FIG. 8. In this embodiment, an external RFID module 83 which contains the conventional components of a RFID device 65 and coil 67 is interfaced to the appliance via a communication bus port and cable connector 85. The information to and from the appliance will be transmitted through a communication bus 87 to the appliance's security and control logic 89. In similar fashion to the embodiment described above, the security and control logic 89 of the appliance interfaces with permanent data storage 91 and controls the operation of a disabling device 93 which may comprise both hardware and software components as appropriate. The use of the external RFID module 83 allows for wide applicability of the system of the instant invention as it does not specifically tie the appliance to any one particular frequency of operation (,See Background of the Invention section for discussion of the available frequencies currently in use for RFID devices). Such an external system allows a manufacturer to use its existing RFID equipment without having to worry if this is compatible with the shipping company or the retail outlet which may utilize different RFID frequency systems.

Figure 9:
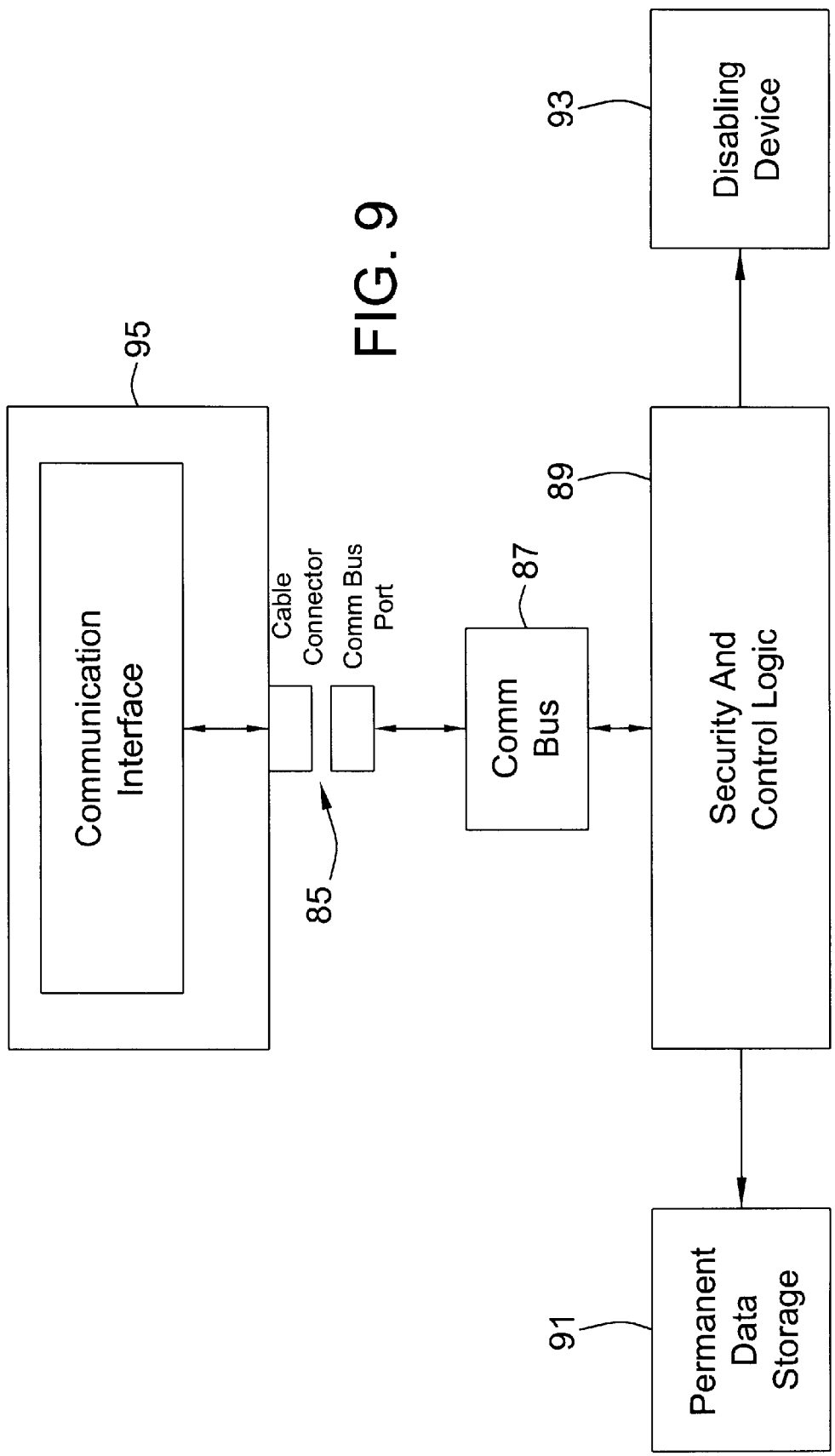
FIG. 9 is a single block diagram illustrating a further alternative embodiment of the instant invention.

As illustrated in FIG. 9, the structure of this embodiment allows for other topology communication interfaces 95 to be coupled to the system via the cable connector and communication bus port 85. These other topology communication interfaces 95 allow widespread applicability of the system of the instant invention as the requirement for RFID interfacing equipment is no longer needed at separate stages of the product life cycle. For example, such an interface may allow direct modem communication with the appliance. This communication interface 95 may transmit the UPPC and password information to and from the appliance to allow the securing and control thereof.

Figure 10:
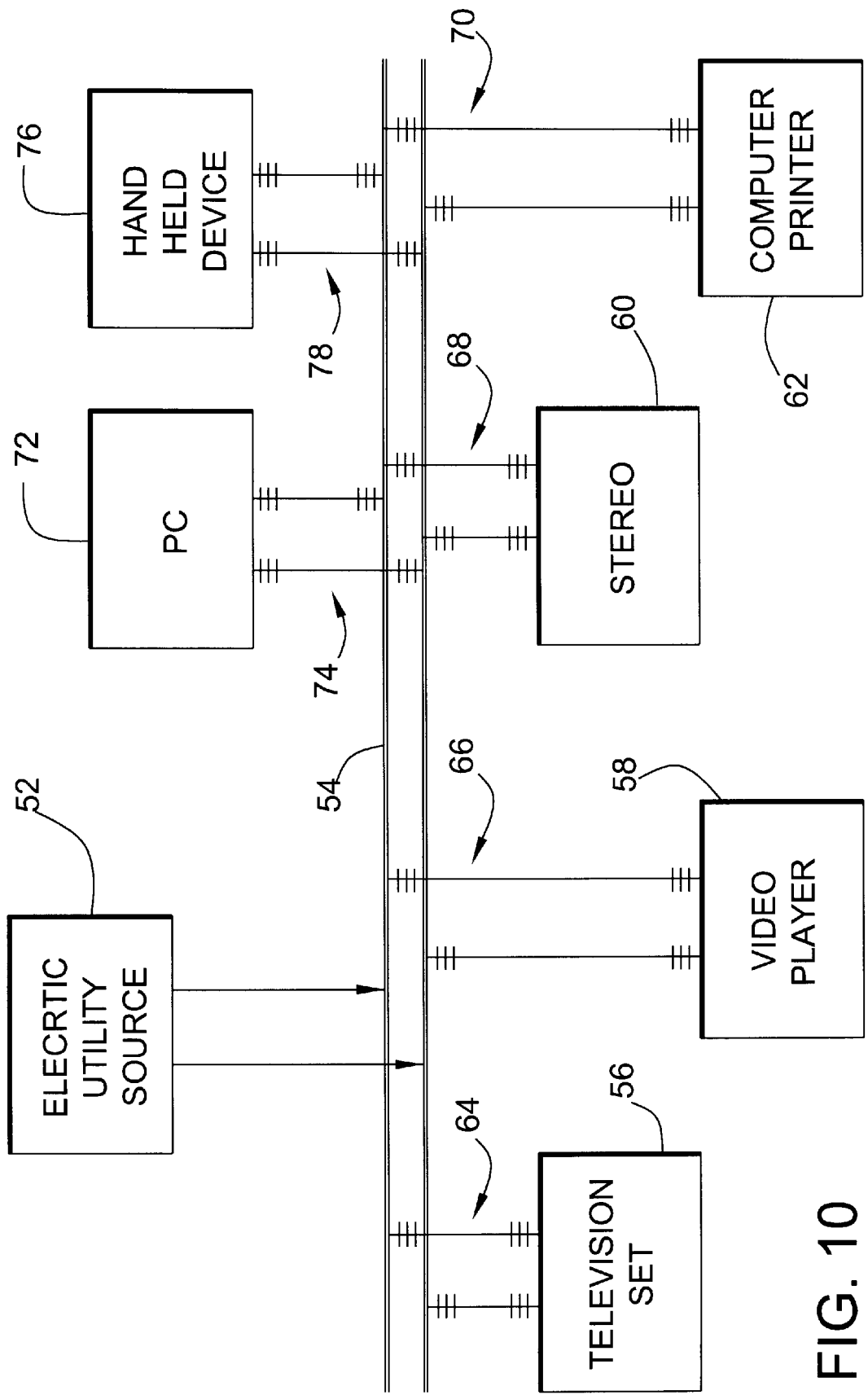
FIG. 10 is a system level single line block diagram constructed in accordance with an embodiment of the instant invention.

In an alternative embodiment, the securing of the appliance once in the possession of the consumer is accomplished once the appliance has been plugged in to the electrical distribution network in the home or office of the consumer, as illustrated in simplified block diagrammatic single line form in FIG. 10. As illustrated in this figure, the electric utility source 52 supplies electric power to the power distribution network 54 for electric power distribution throughout the home. This distribution network 54 comprises the wiring and electrical outlets, as well as the circuit breakers and switches commonly used in a home, office, or other consumer location. As the individual appliances, illustrated as a television set 56, a video player 58, a stereo 60, and a computer printer 62, are plugged into the distribution network 54 via their individual power cords (64, 66, 68, and 70 respectively), they receive electric power for operation, and are also now capable of individually receiving the security information to place them into a secured state. This security information is communicated to the individual appliances via the electric power distribution network 54 through a conventional electric power distribution communications protocol, such as X-10 CEBus, or other appropriate communications protocol. Preferably, the communication and coordination of the security information is contained within a consumer s personal computer 72 which is also plugged into the electric power distribution network 54 by power cord 74. Alternatively, or additionally, the security information may be communicated to the appliances via a portable hand held device 76 which is plugged into the electrical system via a common electrical outlet by power and communication cord 78. While FIG. 10 illustrates the use of both a personal computer 72 as well as a hand held device 76, one skilled in the art will recognize that the use of both of these is not required as much of their functionality in this context is duplicative. However, for enhanced security of the appliances, including the personal computer 72, the hand held device 76 may be utilized.

Figure 11:
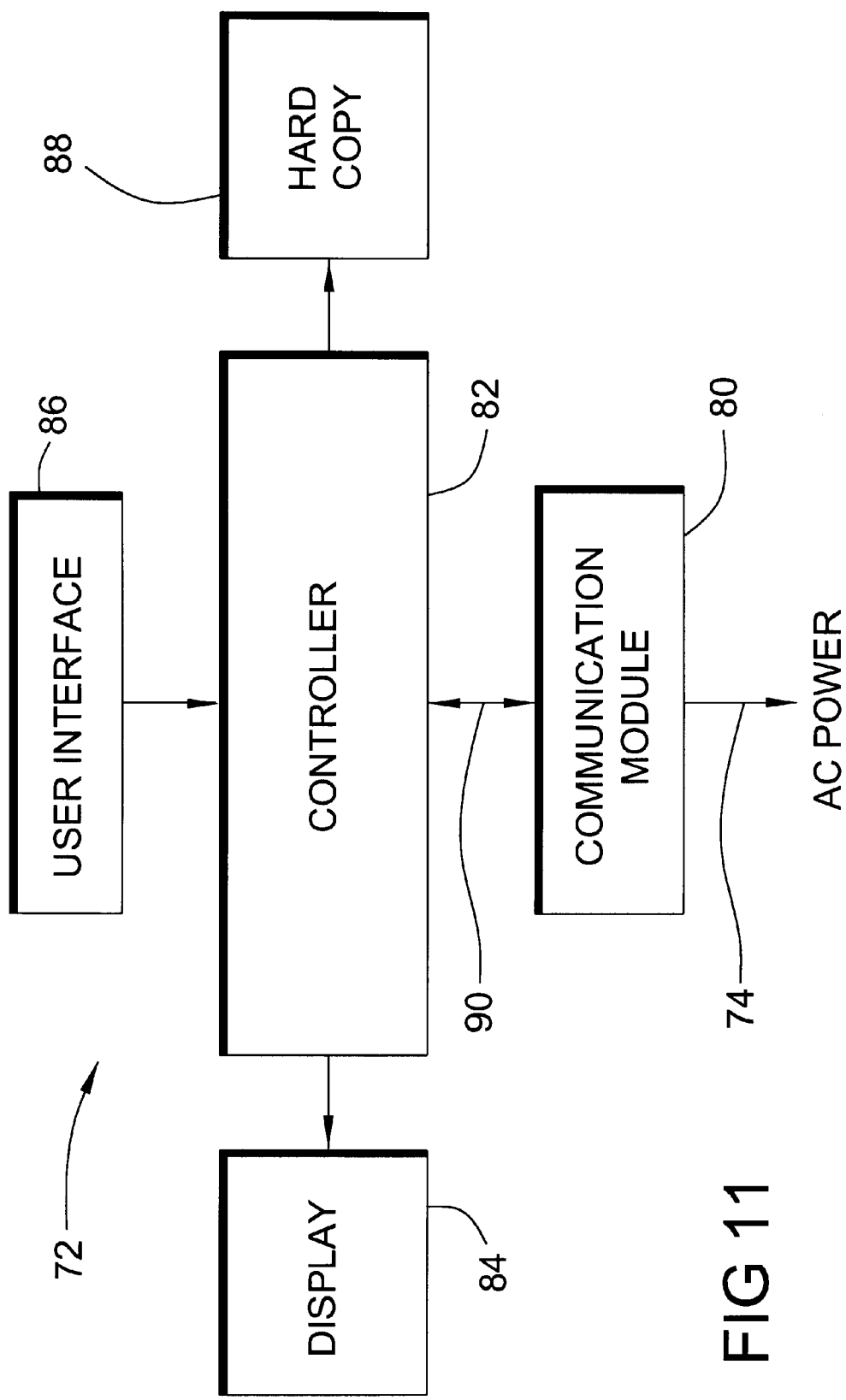
FIG. 11 is a simplified component block diagram in accordance with an aspect of the instant invention.

When the personal computer 72 is utilized to transmit security information over the electrical power distribution network 54, it preferably includes a communications module 80 which is coupled to the electric power cord 74 as illustrated in block diagrammatic form in FIG. 11. As may be seen from this simplified block diagram, the communications module 80 interfaces directly with the main controller 82 of the PC 72. In conventional manner, the PC 72 typically includes a display device 84, a keyboard or other user interface 86, the capability of printing a hard copy 88 when desired. The communication module 80 may vary depending upon the particular electric power system communications protocol chosen and may be, in a preferred embodiment, an X-10 CM11A which includes an RS-232 serial port 90 as its communications interface with the controller 82. Obviously, a different communication module 80 may be needed if a different communication protocol were chosen.

Figure 12:
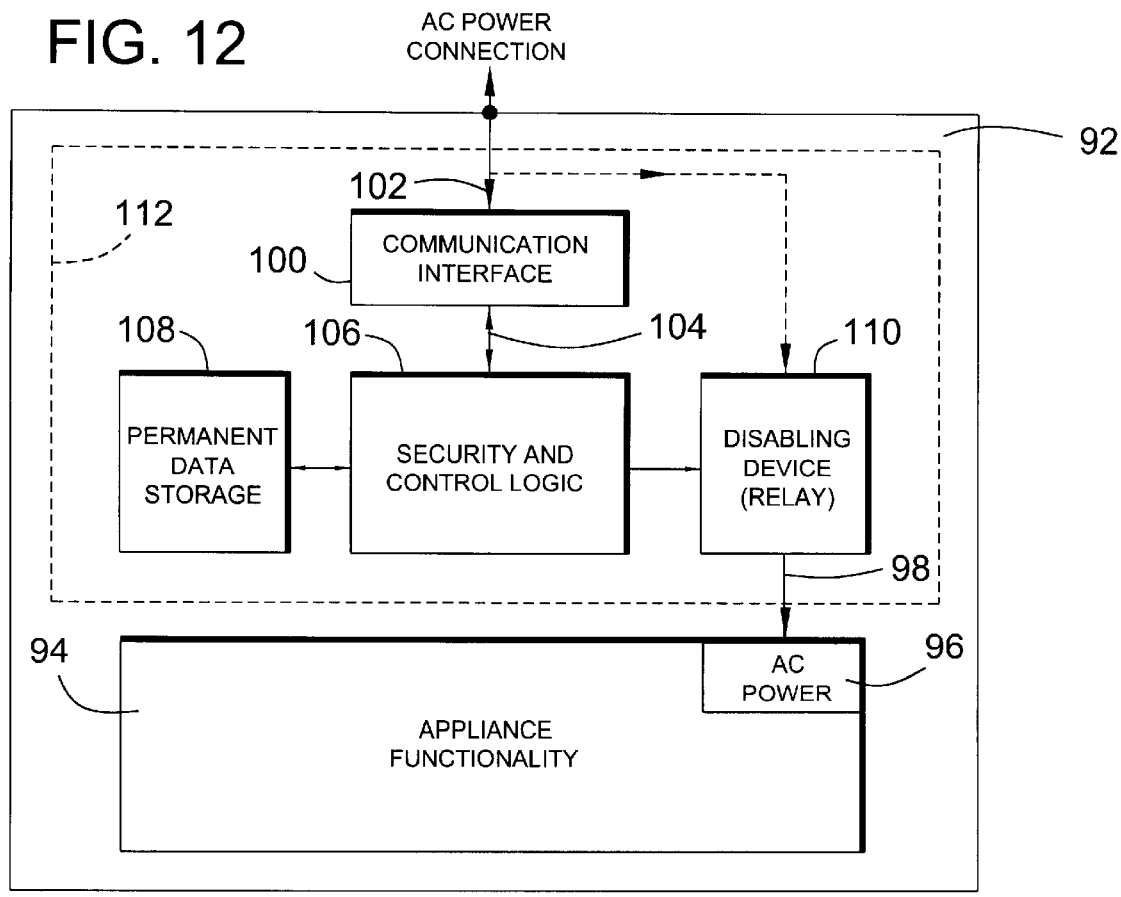
FIG. 12 is a simplified component block diagram illustrating a further aspect of the instant invention.

With respect to the appliances. FIG. 12 illustrates a simplified block diagram of an exemplary appliance constructed in accordance with the teachings of the instant invention. This exemplary appliance 92 contains internal electronics 94 which produce the appliance functionality, and which include a power supply section 96 which conditions the electric power from the AC power connection 98 for use by the control electronics 94. In the embodiment illustrated in FIG. 12, the communication interface 100, which may be preferably an X-10 CM11A communications module, interfaces directly with the AC power connection 102 which is coupled to the electric power distribution network (not shown). The communication interface module 100 preferably communicates via an RS-232 serial port 104 with the security and control logic module 106, which may be a PIC16C73 microprocessor, or other appropriate processing means.

The security and control logic 106 exchanges data with a permanent data storage device 108 which contains, for example, the unique appliance identification, the security code set by the system, etc. The security and control logic 106 also coordinates the operation of a disabling device 110 which is preferably interposed between the electric power connection 102 to the electric power distribution network (not shown) and the connection of electric power 98 to the power module 96 of the appliance 92. In this way, the power to the appliance electronics 94 may be commanded on or off by the security and control logic 106 in response to communications transmitted over the electric power distribution network and received by the communication interface 100. While FIG. 12 illustrates the communication and control element 112 as internal to the appliance 92, one skilled in the art will recognize that such a communications element 112 may be externally mounted from the appliance 92 as an adapter. This will allow for increased applicability of the system of the instant invention to existing appliances which do not have, or were not designed for internal communications and control mounting of element 112. In such an embodiment, the communication and control element 112 would form an adapter and could simply be interposed between the electrical wall outlet and the end of the power cord for the appliance.

Figure 13:
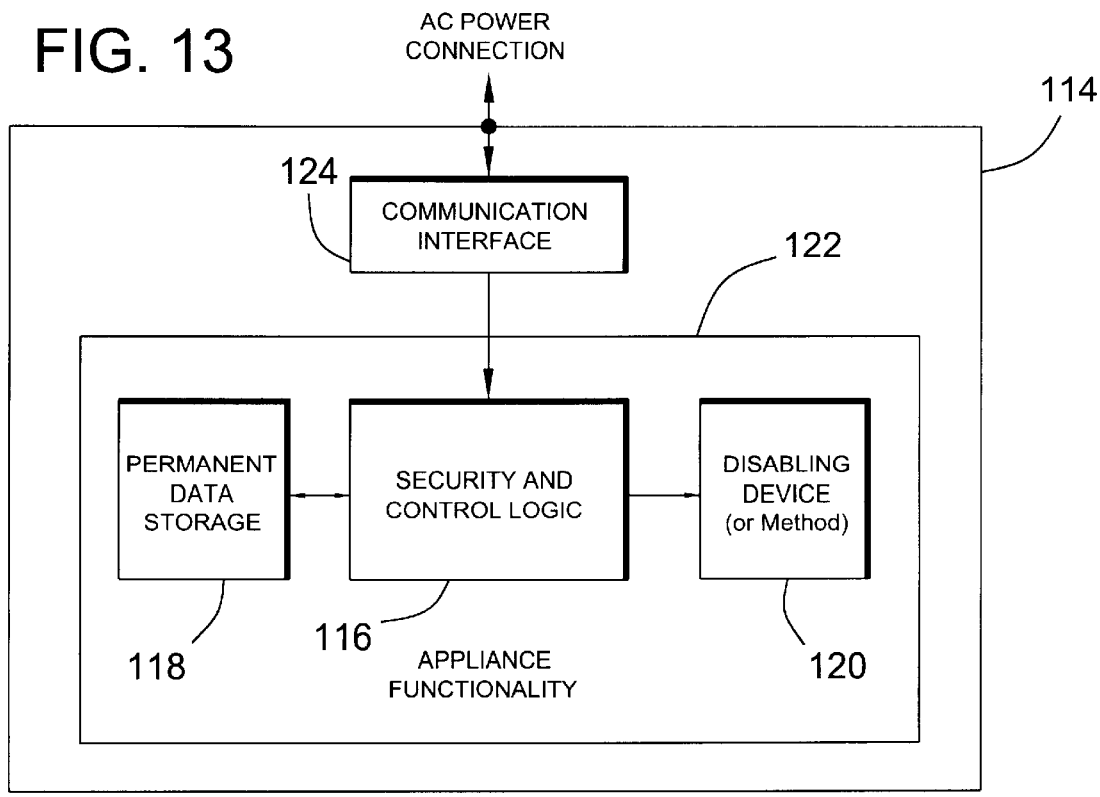
FIG. 13 is a simplified component block diagram illustrating an alternate aspect of the instant invention.

An alternate embodiment of an appliance 114 suitable for use with, and incorporating the teachings of the instant invention is illustrated in FIG. 13. In this embodiment, the appliance 114 incorporates the security and control logic functionality 116, the permanent data storage elements 118, and the disabling device or method 120 within the appliance functionality electronics 122. Preferably, the communication interface 124 is still a separate module allowing for the interchangeability with different communications protocols depending upon a consumer's preferences for his internal electric power distribution network communications system. In this embodiment, the disabling device or method 120 performs the functionality of disabling the appliance when commanded to do so, or in response to the security features of the system. This functionality may be performed electronically within the microprocessor functionality control by disabling processor operation, or may be a disabling type relay used in conjunction with the power supply for the appliance. If this second option is employed, the relay should be installed such that stored parameters and presets within the appliances are not reset. Other implementations of the disabling functionality of element 120 may be utilized as appropriate, and it is the intent of this application to cover all such implementations.

Figure 14:
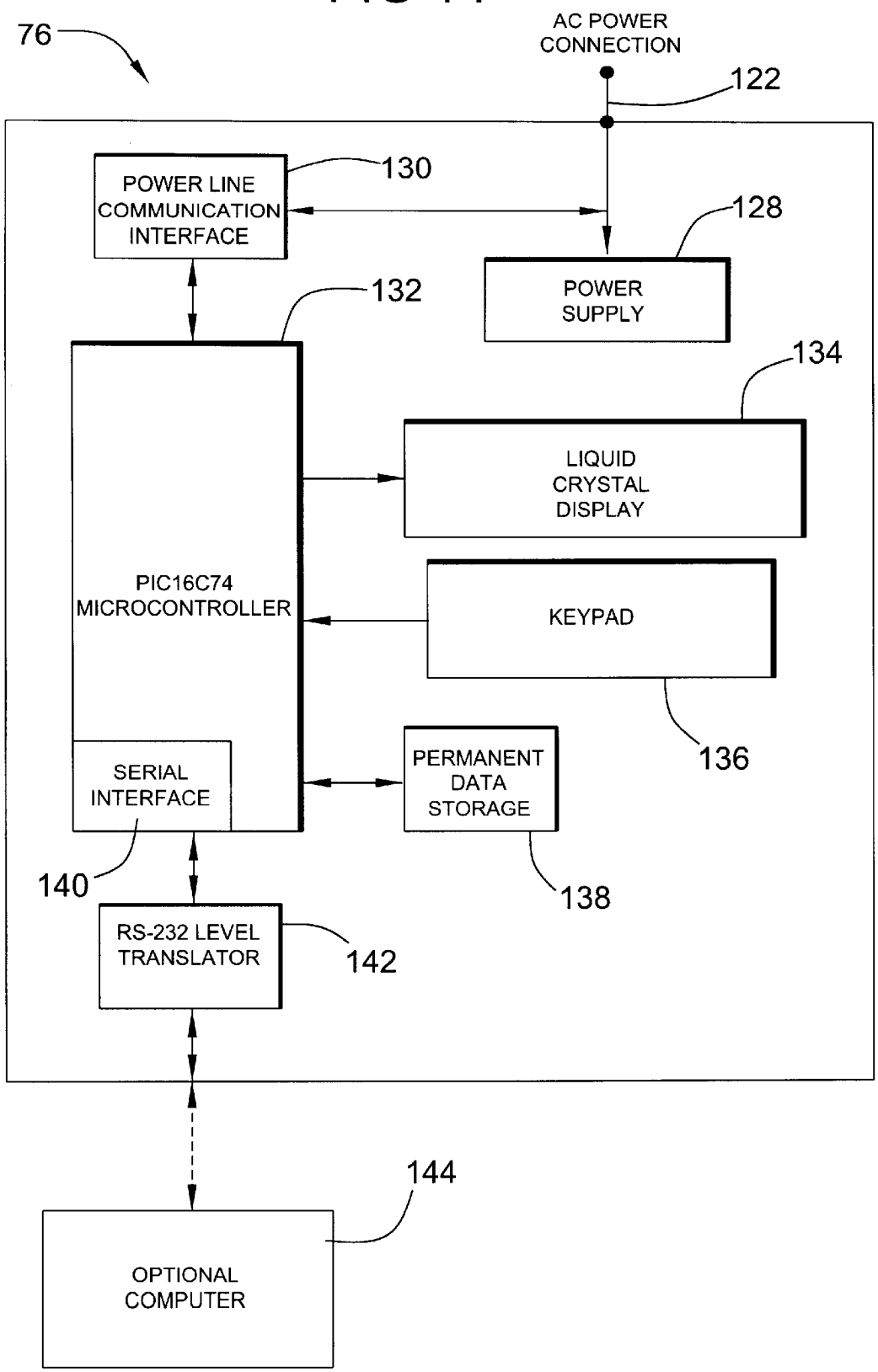
FIG. 14 is a simplified block diagrammatic illustration of a portable control unit in accordance of the teachings of the instant invention.

As described above, this system may also operate with a portable hand held unit 76, a simplified block diagram of which appears in FIG. 14. As may be seen from this figure, the hand held unit 76 includes an AC power connection 126 which is plugged into the standard wall outlet of the electric power distribution network (not shown). The AC power coupled by this connector 126 is used conventionally by an internal power supply 128, and also is connected to the power line communication interface module 130. This power line communication interface module 130 may be of the type described above, or may be a universal communications protocol unit which allows for electronic communication over the electric power distribution network using multiple communications protocols. Preferably, however, this power line communication interface module 130 communicates via the X-10 communications protocol.

The power line communication interface 130 communicates with and is controlled by a microcontroller 132, which may be preferably a PIC16C74 microcontroller. This microcontroller 132 coordinates the control and security functions of the system, and transmits and receives the required information over the electric power distribution network as described above. The hand held unit 76 also includes a display, such as liquid crystal display 134, to allow display of required information to the user. Additionally, a user keypad 136 or other user interface is included to allow consumer input to the microcontroller 132. The microcontroller 132 also interfaces with a permanent data storage module 138 which is used to store the security and identification information of the coupled appliances installed within the system.

While not required, the hand held unit 76 may preferably utilize the serial interface 140 of the microcontroller 132 to provide communication with, for example, a user's personal computer 144. Preferably, the serial interface 140 will utilize an RS-232 level translator 142 to provide adequate signal level communication with the user's personal computer. Alternatively, the translator 142 may be replaced with a modem to provide remote communications via a telephone line. In either case, the hand held unit 76 may "dump" collected and stored data on appliance power usage, operating states, etc. To collect this data, the hand held unit is plugged into a wall socket for a period of time to allow it to communicate with and store data from the appliances coupled to the system.

Figure 15:
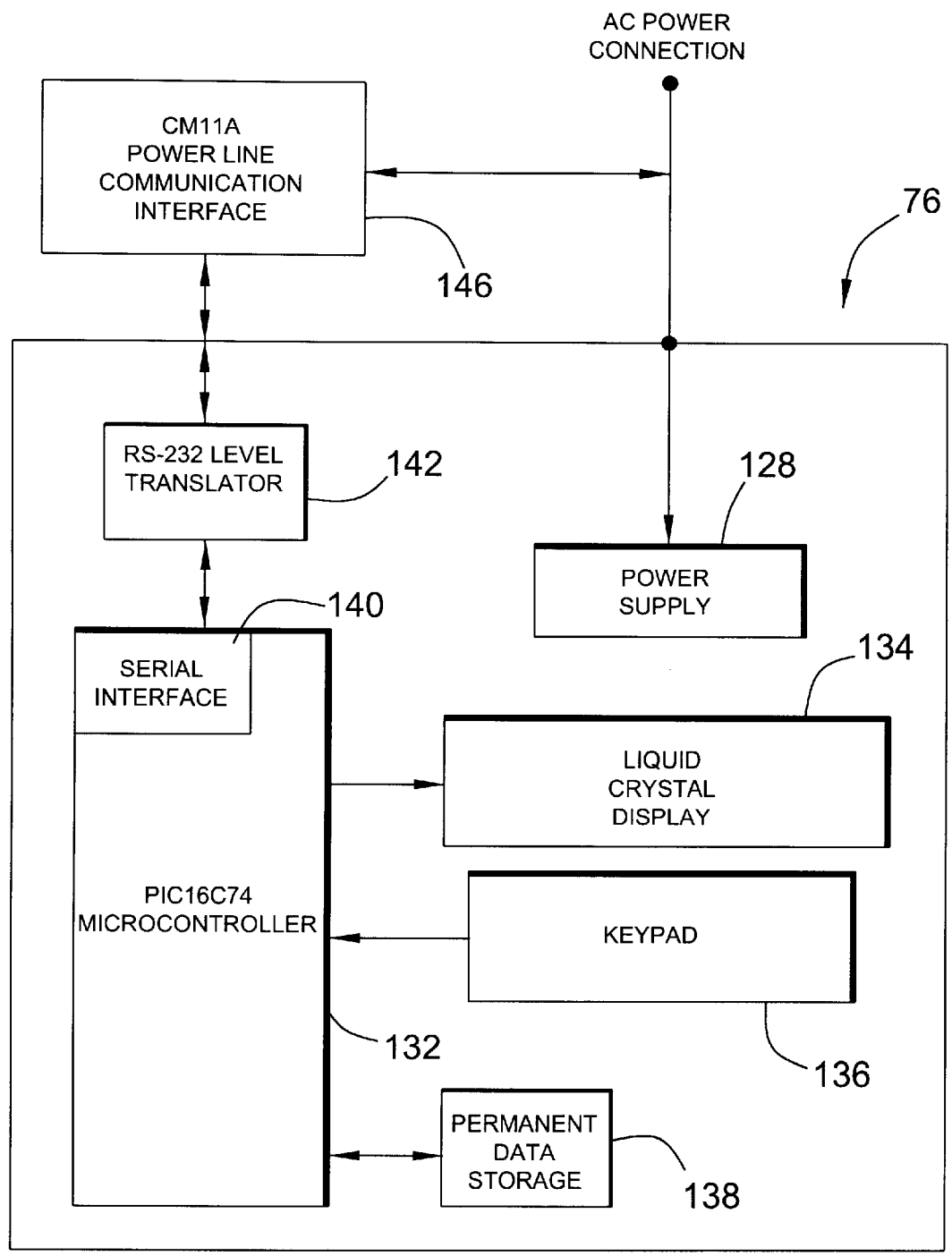
FIG. 15 is a simplified block diagrammatic illustration of an alternate embodiment of a portable control unit in accordance with the teachings of the instant invention.

An alternate embodiment of the portable unit 76 of the instant invention is illustrated in block diagrammatic form in FIG. 15. In this embodiment, the power line communication interface module 146 is an external device which, through replacement, allows the unit 76 to be utilized with multiple communication protocols. This communication interface 146 may be a plug-in module or card which plugs into the unit 76, or may be a separate module which is interposed between the AC power connection and the input to the unit 76 itself. In a preferred embodiment of the instant invention, the communication interface module 146 is an X-10 CM11A power line communication interface module. In this configuration of the hand held unit 76, the serial interface 140 of the microcontroller 132 is utilized for the communication with the communication interface module 146. Preferably, an RS-232 level translator 142 is utilized for this function.

Having undertaken a description of the hardware system components in the electronic identification, control, and security system of the instant invention, the description now turns to the system functionality implemented thereby. As the system has many aspects and broad functionality, the following description will attempt to present a logical progression of the use of the system from original manufacture through purchase, installation, control, and attempted theft.

As described above with reference to FIGS. 1 and 2, the security feature of the instant invention may preferably first be set by the appliance manufacturer to prevent internal theft, or theft during the transportation and final distribution to the retail outlet. This would be accomplished by the appliance manufacturer setting the internal security code to disable the appliance from operation. The unit would then be in the secured state, requiring that the security code be input to unlock the device and allow operation thereof. In one embodiment of the instant invention, a separate lock and unlock security code could be implemented to control the security of the appliance. Preferably however, the system would utilize a watch dog timer type arrangement whereby periodic reception of the required security code would be needed to maintain the appliance in an operational mode. That is to say, the appliance would continually or periodically look for the security code to be received from the electrical power distribution network to ensure its continued existence at a particular consumer location. If the appliance were not to receive the security code within its timeout period, it would automatically enter a non-operational security state, precluding further operation of the appliance until such time as its security register were reset, or otherwise were to receive the proper security code. In this way, theft of the appliance would be discouraged, because operation of the appliance would be prevented without knowing the security code with which that particular appliance had been programmed.

Once purchased by consumer, the retail store could either reset the security register such that the appliance would be in an unsecured state allowing operation of the appliance without the need for transmission of a security code signal, or the retail store could provide the consumer with the preset security code to allow operation of the appliance in their home by utilizing the system of the instant invention. With the system of the instant invention, the consumer may set the security code to a common code for all appliances owned by that particular consumer encoupled to his electric power distribution network. This would be accomplished either through the hand held unit described above or through the personal computer interface also described above.

In an embodiment of the instant invention whereby a personal computer is utilized to coordinate the security features of the instant invention, the personal computer preferably periodically transmits the security code over the electric power distribution network to maintain all appliances coupled thereto in an operational state. However, as this embodiment requires that the personal computer continuously, periodically transmit information over the electric power distribution network, the system may alternately utilize a security set mode whereby an appliance would be enabled via transmission of the security code, and would continue to operate normally until the unit is unplugged from the electric power distribution network, or electric power is otherwise removed therefrom. Once electric power has been removed and reapplied to the appliance, the system would function to preclude operation of the appliance until reception of the security code as previously set by the system. This would preclude theft of the device by locking out further functionality of the appliance once it has been unplugged and removed from the residence of the consumer. In this embodiment, the system would include a power delay timeout which prevents the lock out from operating for a given period, e.g., 15 seconds, following the loss of power. This power delay timeout prevents the necessity of initiating a password reset due to a power transient. This type of functionality is particularly desirable when the system is operated with the hand held unit described above. In this way, the hand held unit need only be utilized initially upon installation of the appliance, and after each power loss to the appliance.

To prevent the compromise of a single security code jeopardizing the security of all appliances either manufactured by an appliance manufacturer or installed within a consumer location, the system of the instant invention also contemplates the ability to set individual security codes for individual appliances. This is accomplished in the instant invention through the use of an individualized identification code stored within or otherwise associated with individual appliances. In this way, a matrix would be established within the system to associate each individual appliance with its particular security code. Advantageously, the use of this individualized appliance identification code also allows for individualized control of the appliances via the communication network over the electric power distribution system at the consumer location. As described above, the individualized addressed message would be ignored by all other appliances coupled to the electric power distribution network, and would only be acted upon by the particular appliance to which the message was directed.

While the particular format of the individualized identification information for each appliance may take any suitable form which allows for individual identification and addressing of the appliance, a preferred format will be described hereinbelow. Specifically, a preferred implementation of the electronic identification information takes the form of a twenty byte word. Preferably the word is segmented to allow for five bytes for UPC information identifying the make, model, etc. of the appliance, four bytes to identify the manufacture date, one byte to identify the shut down current threshold information to allow the system of the instant invention to coordinate control and load shed operations which will be described more fully hereinbelow, five bytes for the security code, and an additional five bytes for the lot number of the appliance. While not all of this information is required to allow the aforementioned security functionality of the system, it is included for enhanced control features as will be described below.

Through the use of the individualized identification of the various appliances installed in a consumer location, the system of the instant invention may be utilized to coordinate the functionality of these appliances through the centralized communication and control provided by the system. Control of the individual components may be coordinated through the consumer's personal computer 72 (see FIG. 10), or may alternatively be coordinated through the hand held device 76. Using either implementation, the consumer would access the system of the instant invention, selecting the appliance ID, and performing the desired control functions thereon. For example, the consumer may set hours of operation for individual appliances so that they may be used only during certain hours of the day. This programming would be maintained even if the particular appliance were removed from its current physical location within the consumer residence and moved to an alternate location. Regardless of that particular appliance's physical location within the consumer's residence, at the appointed hour the system would transmit an individualized addressed message disabling the appliance from further operation until the appointed hour for its reenablement. In addition to coordinated programming of the operation of various appliances, the system may be utilized to control the operation of the various appliances at that particular time. As will be recognized by one skilled in the art, such coordinated control of individual appliances through a personal computer would also allow for remote control of these appliances through external modem communications with the personal computer 72.

The system of the instant invention may also be utilized to maintain performance information concerning each of the individual appliances utilized in the consumer location. Particularly, the operational status of each of the appliances may be monitored by the system of the instant invention through information transmitted from each of the individual appliances over the electrical distribution network to the central control of the system. The system would then record the operational status of each appliance, as well as any other information transmitted therefrom, in a database to allow coordination for, for example, built in test information, failure information, and warranty information.

Additional operational information may be included in the functionality of the individual appliances, encoded with the device ID information of the instant invention, and transmitted over the electric power distribution network in accordance with the teachings of the instant invention. Specifically, the actual power usage as a function of time, average power usage, total amp-hour usage may all be monitored. Furthermore, because the threshold states for on/off/failure as recommended by the manufacturer may be stored by the system, this power monitoring may be used to prompt users to take certain actions, e.g., a high refrigerator current draw may signal the system to prompt the user to clean the refrigerator coils or seek service. The system may also utilize this information to automatically turn off an appliance if the recommended maximum power utilization levels are exceeded. If an appliance is turned off in this manner, it may be reenabled without the requirement of a password (non-secure re-energization) with or without a description of the reason why it turned off.

One of the significant advantages of the individual identification information of the instant invention is that system control functionality accommodated by various electric power distribution network communication protocols such as X-10 and CEBus is may be advantageously used without the need for reprogramming upon physical movement of appliances within a consumer location. As an example, without individual identification of the consumer appliances, the physical movement of a particular appliance from one electrical outlet to another necessitates the reprogramming of the system to recognize the appliance's new physical location. With the system of the instant invention, this is no longer a problem as the individual appliance is addressed by individual ID as opposed to by physical location as with other systems. Therefore, the user is not tied to a particular configuration, but may freely rearrange the physical location of devices within the consumer location without having to repeat a time consuming process of programming the entire centralized control system in response.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure and implementation of the various components described above can be varied substantially without departing from the spirit of the invention, and exclusive use of all modifications that come within the scope of the appended claims is reserved.

What is claimed is:

1. A method for deterring theft of manufactured articles, comprising the steps of:
   programming a unique electronic universal product protection code (UPPC) into each manufactured article;
   associating the UPPC with a password in an external computer system;
   transmitting the password via radio frequency to each manufactured article;
   disabling operation of each manufactured article in response to receipt of the password;
   receiving UPPC information from a user for a particular article;
   recalling from the external computer system the password associated with the UPPC information for the particular manufactured article; and
   transmitting the password to the user to enable operation of the particular manufactured article.

2. A method for deterring theft of manufactured articles, comprising the steps of:
   programming a unique electronic universal product protection code (UPPC) into each manufactured article;
   electronically interrogating al least one manufactured article for the UPPC information programmed herein prior to transport of the manufactured article;
   storing the UPPC information in a computerized shipping system;
   generating a password in the computerized shipping system associated with the UPPC information; and
   transmitting the password via radio frequency to each manufactured article; and
   disabling operation of each manufactured article in response to receipt to the password prior to shipping the manufactured articles.

3. The method of claim 2, further comprising the steps of:
   electronically interrogating the at least one manufactured article for the UPPC information programmed therein upon receipt of the at least one manufactured article;
   comparing the UPPC information stored in the computerized shipping system with the UPPC information interrogated upon receipt to confirm receipt of the at least one manufactured article transported;
   retrieving the password associated with the UPPC information from the computerized shipping system; and
   transmitting the password from the computerized shipping system to the at least one manufactured article to enable operation thereof.

4. A method for deterring theft of manufactured articles, comprising the steps of:
   programming a unique universal product protection code (UPPC) into each manufactured article;
   transmitting a password via radio frequency to each manufactured article;
   disabling operation of each manufactured article in response to receipt to the password prior to shipping the manufactured articles;
   transmitting the associated UPPC and password information to a central computerized system;
   interrogating the manufactured article at a point of purchase to retrieve the programmed UPPC information;
   retrieving the password associated with the UPPC for the manufactured article from the central computerized system; and
   transmitting the password to the manufactured article at the point of purchase to enable operation thereof.

5. The method of claim 4, further comprising, after the step of transmitting the password to the manufactured article at the point of purchase, the steps of:
   energizing the manufactured article;
   setting a user defined password for the manufactured article; and
   disabling operation of the manufactured article upon loss of energization to the manufactured article.

6. The method of claim 5, further comprising, after the step of disabling operation of the manufactured article upon loss of energization, the steps of:
   energizing the manufactured article, the manufactured article remaining in a disabled state;
   entering the user defined password for the manufactured article to enable operation thereof.

7. The method of claim 5, further comprising the steps of:
   transmitting the user defined password and the associated programmed UPPC to the central computerized system;
   storing the user defined password and the UPPC in the central computerized system; and thereafter
   transmitting the UPPC to the central computerized system upon energization of the manufactured article;
   retrieving the password associated with the UPPC for the manufactured article from the central computerized system; and transmitting the user defined password to the manufactured article to enable operation thereof.

8. The method of claim 5, further comprising the steps of:

periodically interrogating the manufactured article to determine a presence thereof; and enunciating the absence of the manufactured article in response to a lack of response to said step of periodically interrogating.

9. A method for deterring theft of manufactured articles, comprising steps of:

programming a unique universal product protection code (UPPC) into each manufactured article;

transmitting a password via frequency to each manufactured article; and disabling operation of each manufactured article in response to receipt of the password;

periodically interrogating the manufactured article to determine a presence thereof; and enunciating the absence of the manufactured article in response to a lack of response to said step of periodically interrogating.

10. A system for deterring theft of manufactured articles, comprising:

a unique identification code programmed into each manufactured article;

a password code associated with the unique identification code;

communication circuitry capable of transmitting said password code to the manufactured articles; and appliance disabling circuitry integrated within the manufactured articles, said appliance disabling circuitry precluding operation of the manufactured articles upon receipt of the password code associated with said unique identification code programmed therein;

wherein said communication circuitry comprises an RFID interrogator and an RFID device; and wherein said RFID device is integrated within the manufactured articles and operatively coupled to said appliance disabling circuitry.

11. The system of claim 10, further comprising communication interface circuitry interposed between said communication circuitry and said appliance disabling circuitry, and wherein said RFID device removably interfaces with said communication interface circuitry.

12. A manufactured appliance, comprising:

security and control logic circuitry;

data storage memory;

a unique identification code stored in said memory;

communication circuitry capable of receiving a transmitted password;

wherein said transmitted password is thereafter stored in said memory in association with said unique identification code;

wherein said security and control logic disables operation of the manufactured appliance in response to receipt of said transmitted password; and wherein said communication circuitry is an RFID device operably coupled to said data storage memory and said security and control logic circuitry.

* * * * *